US008782706B2

(12) United States Patent
Ellis

(10) Patent No.: US 8,782,706 B2
(45) Date of Patent: Jul. 15, 2014

(54) SYSTEMS AND METHODS FOR PROVIDING CHANNEL GROUPS IN AN INTERACTIVE MEDIA GUIDANCE APPLICATION

(75) Inventor: Michael D Ellis, Boulder, CO (US)

(73) Assignee: United Video Properties, Santa Clara, CA (US)

( * ) Notice: Subject to any disclaimer, the term of this patent is extended or adjusted under 35 U.S.C. 154(b) by 1054 days.

(21) Appl. No.: 11/324,192

(22) Filed: Dec. 29, 2005

(65) Prior Publication Data

US 2007/0157248 A1 Jul. 5, 2007

(51) Int. Cl.

| | |
|---|---|
| ***G06F 3/00*** | (2006.01) |
| ***G06F 13/00*** | (2006.01) |
| ***H04N 5/445*** | (2011.01) |

(52) U.S. Cl.

USPC .................. 725/47; 725/40; 725/43; 725/44; 725/45; 725/46; 725/48; 725/49; 725/50; 725/52; 725/56; 725/59; 725/61

(58) Field of Classification Search

USPC .................. 725/40, 43, 44-50, 52, 56, 59, 61

See application file for complete search history.

(56) References Cited

U.S. PATENT DOCUMENTS

| | | | |
|---|---|---|---|
| 4,081,753 | A | 3/1978 | Miller |
| 4,170,782 | A | 10/1979 | Miller |
| 4,271,532 | A | 6/1981 | Wine |
| 4,367,559 | A | 1/1983 | Tults |
| 4,375,651 | A | 3/1983 | Templin et al. |
| 4,381,522 | A | 4/1983 | Lambert |
| 4,390,901 | A | 6/1983 | Keiser |
| 4,425,579 | A | 1/1984 | Merrell |
| 4,429,385 | A | 1/1984 | Chchelli et al. |
| 4,488,179 | A | 12/1984 | Kruger et al. |
| 4,495,654 | A | 1/1985 | Deiss |
| 4,527,194 | A | 7/1985 | Sirazi |
| 4,602,279 | A | 7/1986 | Freeman |

(Continued)

FOREIGN PATENT DOCUMENTS

| | | |
|---|---|---|
| CN | 1315805 | 10/2001 |
| CN | 1375164 | 10/2002 |

(Continued)

OTHER PUBLICATIONS

Extended European Search Report dated Jan. 24, 2011 in European Application No. EP10183390.

(Continued)

*Primary Examiner* — Jason Salce

(74) *Attorney, Agent, or Firm* — Ropes & Gray LLP

(57) ABSTRACT

The present invention relates an interactive media guidance application that provides channel groups. Channel groups may include media channels, such as television channels, radio stations, Internet web sites, etc. Channel groups may be organized around a common characteristic, by utilizing user profile information, and by human editorial selection (e.g., by a service provider or by a user). The guidance application provides information on the channel groups, including media listings, reminders, pending and completed recordings, purchased programs, and previously accessed programs for the channel group. The guidance application enables the user to focus a guidance application function on the channel group. In response to a user initiation to execute the function on the channel group, the function may be executed on all the media channels belonging to the channel group. Information on the channel group and access to functions that are executable on the channel group may be concentrated in a channel group portal screen of the guidance application.

48 Claims, 24 Drawing Sheets

(56) References Cited

U.S. PATENT DOCUMENTS

| | | | | | |
|---|---|---|---|---|---|
| 4,641,205 | A | | 2/1987 | Beyers, Jr. | |
| 4,689,022 | A | | 8/1987 | Peers et al. | |
| 4,694,490 | A | | 9/1987 | Harvey et al. | |
| 4,754,326 | A | | 6/1988 | Kram et al. | |
| 4,908,713 | A | | 3/1990 | Levine | |
| 4,918,603 | A | | 4/1990 | Hughes et al. | |
| 4,963,994 | A | | 10/1990 | Levine | |
| 5,018,736 | A | | 5/1991 | Pearson et al. | |
| 5,038,211 | A | | 8/1991 | Hallenbeck | |
| 5,047,867 | A | | 9/1991 | Strubbe et al. | |
| 5,068,728 | A | | 11/1991 | Macovski | |
| 5,075,771 | A | | 12/1991 | Hashimoto | |
| 5,175,627 | A | | 12/1992 | Josephs | |
| 5,208,670 | A | | 5/1993 | Sugimori et al. | |
| 5,210,611 | A | | 5/1993 | Yee et al. | |
| 5,223,924 | A | | 6/1993 | Strubbe et al. | |
| 5,263,723 | A | | 11/1993 | Pearson et al. | |
| 5,285,284 | A | | 2/1994 | Takashima et al. | |
| 5,317,403 | A | | 5/1994 | Keenan | |
| 5,323,240 | A | | 6/1994 | Amano et al. | |
| 5,331,349 | A | | 7/1994 | Kim | |
| 5,335,277 | A | | 8/1994 | Harvey et al. | |
| 5,359,601 | A | | 10/1994 | Wasilewski | |
| 5,361,098 | A | | 11/1994 | Lucas | |
| 5,410,344 | A | | 4/1995 | Graves et al. | |
| 5,432,561 | A | | 7/1995 | Strubbe | |
| 5,442,403 | A | | 8/1995 | Yasumoto et al. | |
| 5,444,499 | A | | 8/1995 | Saitoh | |
| 5,465,113 | A | | 11/1995 | Gilboy | |
| 5,465,385 | A | | 11/1995 | Ohga et al. | |
| 5,477,262 | A | | 12/1995 | Banker et al. | |
| 5,479,268 | A | | 12/1995 | Young et al. | |
| 5,481,296 | A | | 1/1996 | Cragun et al. | |
| 5,483,278 | A | | 1/1996 | Strubbe et al. | |
| 5,534,911 | A | | 7/1996 | Levitan | |
| 5,557,338 | A | | 9/1996 | Maze et al. | |
| 5,585,866 | A | | 12/1996 | Miller et al. | |
| 5,589,892 | A | | 12/1996 | Knee et al. | |
| 5,594,507 | A | | 1/1997 | Hoarty | |
| 5,594,509 | A | | 1/1997 | Florin et al. | |
| 5,617,565 | A | | 4/1997 | Augenbraum et al. | |
| 5,623,613 | A | | 4/1997 | Rowe et al. | |
| 5,652,628 | A | | 7/1997 | Toyoshima et al. | |
| 5,699,107 | A | * | 12/1997 | Lawler et al. | 725/58 |
| 5,699,125 | A | | 12/1997 | Rzeszewski et al. | |
| 5,731,844 | A | | 3/1998 | Rauch et al. | |
| 5,752,160 | A | | 5/1998 | Dunn | |
| 5,754,253 | A | | 5/1998 | Lee | |
| 5,758,259 | A | | 5/1998 | Lawler | |
| 5,774,357 | A | | 6/1998 | Hoffberg et al. | |
| 5,774,664 | A | | 6/1998 | Hidary et al. | |
| 5,781,246 | A | | 7/1998 | Alten et al. | |
| 5,790,935 | A | | 8/1998 | Payton | |
| 5,798,785 | A | | 8/1998 | Hendricks et al. | |
| 5,801,747 | A | | 9/1998 | Bedard | |
| 5,812,937 | A | | 9/1998 | Takahisa et al. | |
| 5,822,123 | A | | 10/1998 | Davis et al. | |
| 5,841,433 | A | | 11/1998 | Chaney | |
| 5,846,132 | A | | 12/1998 | Junkin | |
| 5,848,396 | A | | 12/1998 | Gerace | |
| 5,860,862 | A | | 1/1999 | Junkin | |
| 5,867,226 | A | | 2/1999 | Wehmeyer | |
| 5,875,108 | A | | 2/1999 | Hoffberg et al. | |
| 5,880,768 | A | | 3/1999 | Lemmons et al. | |
| 5,903,545 | A | | 5/1999 | Sabourin et al. | |
| 5,912,664 | A | * | 6/1999 | Eick et al. | 715/810 |
| 5,940,073 | A | | 8/1999 | Klosterman et al. | |
| 5,945,987 | A | * | 8/1999 | Dunn | 715/718 |
| 5,973,683 | A | | 10/1999 | Cragun et al. | |
| 5,977,964 | A | | 11/1999 | Williams et al. | |
| 5,978,766 | A | | 11/1999 | Luciw | |
| 5,982,411 | A | * | 11/1999 | Eyer et al. | 725/49 |
| 6,005,565 | A | | 12/1999 | Legall et al. | |
| 6,005,597 | A | | 12/1999 | Barrett et al. | |
| 6,014,184 | A | | 1/2000 | Knee et al. | |
| 6,025,837 | A | * | 2/2000 | Matthews et al. | 715/721 |
| 6,029,195 | A | | 2/2000 | Herz | |
| 6,075,526 | A | | 6/2000 | Rothmuller | |
| 6,081,750 | A | | 6/2000 | Hoffberg et al. | |
| 6,088,722 | A | | 7/2000 | Herz et al. | |
| 6,133,909 | A | | 10/2000 | Schein et al. | |
| 6,147,714 | A | | 11/2000 | Terasawa et al. | |
| 6,163,316 | A | | 12/2000 | Killian | |
| 6,172,674 | B1 | | 1/2001 | Etheredge | |
| 6,177,931 | B1 | * | 1/2001 | Alexander et al. | 725/52 |
| 6,181,335 | B1 | | 1/2001 | Hendricks et al. | |
| 6,182,287 | B1 | * | 1/2001 | Schneidewend et al. | 725/48 |
| 6,216,264 | B1 | | 4/2001 | Maze et al. | |
| 6,249,320 | B1 | * | 6/2001 | Schneidewend et al. | 348/569 |
| 6,317,882 | B1 | | 11/2001 | Robbins | |
| 6,396,546 | B1 | | 5/2002 | Alten et al. | |
| 6,437,836 | B1 | | 8/2002 | Huang et al. | |
| 6,445,306 | B1 | | 9/2002 | Trovato et al. | |
| 6,505,348 | B1 | | 1/2003 | Knowles et al. | |
| 6,564,379 | B1 | | 5/2003 | Knudson et al. | |
| 6,661,468 | B2 | | 12/2003 | Alten et al. | |
| 6,685,870 | B2 | | 2/2004 | Ukechi et al. | |
| 6,742,183 | B1 | | 5/2004 | Reynolds et al. | |
| 6,769,128 | B1 | | 7/2004 | Knee et al. | |
| 6,817,027 | B1 | * | 11/2004 | Curreri | 725/28 |
| 7,047,547 | B2 | | 5/2006 | Alten et al. | |
| 7,185,355 | B1 | | 2/2007 | Ellis et al. | |
| 7,296,284 | B1 | | 11/2007 | Price et al. | |
| 7,380,262 | B2 | | 5/2008 | Wang et al. | |
| 7,392,531 | B2 | | 6/2008 | Thurston et al. | |
| 7,480,929 | B2 | | 1/2009 | Klosterman et al. | |
| 7,493,641 | B2 | | 2/2009 | Klosterman et al. | |
| 7,552,459 | B2 | | 6/2009 | Klosterman et al. | |
| 7,562,376 | B2 | * | 7/2009 | Matsuzaki | 725/43 |
| 7,690,012 | B2 | * | 3/2010 | Luehrs | 725/28 |
| 2001/0056577 | A1 | * | 12/2001 | Gordon et al. | 725/52 |
| 2002/0056104 | A1 | * | 5/2002 | Burnhouse et al. | 725/39 |
| 2002/0059610 | A1 | | 5/2002 | Ellis | |
| 2002/0112239 | A1 | * | 8/2002 | Goldman | 725/46 |
| 2003/0106061 | A1 | * | 6/2003 | Gusler et al. | 725/59 |
| 2003/0115602 | A1 | | 6/2003 | Knee et al. | |
| 2004/0034867 | A1 | * | 2/2004 | Rashkovskiy et al. | 725/40 |
| 2004/0107439 | A1 | | 6/2004 | Hassell et al. | |
| 2004/0117831 | A1 | | 6/2004 | Ellis et al. | |
| 2004/0237108 | A1 | * | 11/2004 | Drazin et al. | 725/56 |
| 2005/0114340 | A1 | | 5/2005 | Huslak et al. | |
| 2005/0160456 | A1 | * | 7/2005 | Moskowitz | 725/45 |
| 2006/0294545 | A1 | * | 12/2006 | Morris et al. | 725/41 |
| 2007/0061840 | A1 | * | 3/2007 | Walter et al. | 725/39 |
| 2007/0220554 | A1 | | 9/2007 | Barton et al. | |
| 2008/0127263 | A1 | | 5/2008 | Klosterman et al. | |
| 2008/0127264 | A1 | | 5/2008 | Klosterman et al. | |

FOREIGN PATENT DOCUMENTS

| | | | |
|---|---|---|---|
| EP | 0 721 253 | A2 | 7/1996 |
| EP | 0 725 539 | A2 | 8/1996 |
| EP | 0725538 | A2 | 8/1996 |
| EP | 0 737 007 | A2 | 10/1996 |
| EP | 0 725 539 | A3 | 5/1997 |
| EP | 0 774 866 | A2 | 5/1997 |
| EP | 0 798 921 | A2 | 10/1997 |
| EP | 0 811 940 | A2 | 12/1997 |
| EP | 0 854 645 | A2 | 7/1998 |
| EP | 0 924 927 | | 6/1999 |
| EP | 0 944 258 | | 9/1999 |
| EP | 1143717 | | 10/2001 |
| EP | 1496692 | A2 | 1/2005 |
| EP | 1 534 009 | A2 | 5/2005 |
| EP | 1596589 | | 11/2005 |
| GB | 1 554 411 | | 10/1979 |
| JP | 09-037181 | | 2/1997 |
| JP | 10-294904 | | 11/1998 |
| JP | 11-069254 | | 3/1999 |
| WO | WO-86/01359 | | 2/1986 |
| WO | WO-89/03085 | | 4/1989 |
| WO | WO-94/13107 | | 6/1994 |
| WO | WO-94/14284 | | 6/1994 |
| WO | WO-95/01058 | A1 | 1/1995 |

(56) References Cited

FOREIGN PATENT DOCUMENTS

| | | | |
|---|---|---|---|
| WO | WO-95/28799 | | 10/1995 |
| WO | WO-96/17473 | | 6/1996 |
| WO | WO-96/33572 | | 10/1996 |
| WO | WO-96/41478 | | 12/1996 |
| WO | WO-97/13368 | | 4/1997 |
| WO | WO-97/47135 | | 12/1997 |
| WO | WO-97/48230 | | 12/1997 |
| WO | WO-97/49237 | | 12/1997 |
| WO | WO-98/26584 | | 6/1998 |
| WO | WO-98/43183 | | 10/1998 |
| WO | WO-98/48566 | | 10/1998 |
| WO | WO-98/57498 | | 12/1998 |
| WO | WO-99/01984 | | 1/1999 |
| WO | WO-99/04560 | | 1/1999 |
| WO | WO-99/04561 | | 1/1999 |
| WO | WO-99/35831 | | 7/1999 |
| WO | WO-99/35843 | | 7/1999 |
| WO | WO-99/45701 | | 9/1999 |
| WO | WO-99/56473 | A1 | 11/1999 |
| WO | WO-00/04708 | | 1/2000 |
| WO | WO-00/05887 | A1 | 2/2000 |
| WO | WO-00/05889 | | 2/2000 |
| WO | WO-00/28734 | | 5/2000 |
| WO | WO-00/33576 | A1 | 6/2000 |
| WO | WO-00/46988 | | 8/2000 |
| WO | WO-00/60854 | | 10/2000 |
| WO | WO-01/01677 | | 1/2001 |
| WO | WO 01/35662 | | 5/2001 |
| WO | WO-99/14947 | | 2/2002 |
| WO | WO 02/32120 | | 4/2002 |
| WO | WO-0245304 | A2 | 6/2002 |
| WO | WO-2004107749 | A1 | 12/2004 |
| WO | WO-2005125200 | A2 | 12/2005 |

OTHER PUBLICATIONS

"Program Guide for Digital Television—ATSC Standard," Doc. A/55, Jan. 3, 1996, pp. 1-48, available at http:/www.atsc.org., retrieved on Aug. 31, 2006.

Charpentier, "1984 Fantasy Football Digest," Fantasy Sports, Inc., Jun. 1984.

Charpentier, "1985 Fantasy Football Digest," Lerner Publications Company, 1985.

Donaldson, "The Official Fantasy Football League Manual," Contemporary Books, Inc., 1985.

"All Pro yearbook 1987: The Fantasy Football Magazine," All Pro Publishing Company, 1987.

"Fantasy Football Monthly, The Game," BBC Sport, www.bbcfootball.fantasyleague.co.uk/et al. retrieved on Sep. 17, 2002.

"Fantasy Football Challenge," CNN Sports Illustrated, www.football12201.si.cnn.com/et al., retrieved on Sep. 23, 2002.

"Fantasy Golf Challenge," CNN Sports Illustrated, www.gold5.si.cnn.com/et al., retrieved on Sep. 23, 2002.

"Fantasy Nascar Challenge," CNN Sports Illustrated, www.racing20.si.cnn.com/et al., retrieved on Sep. 23, 2002.

"John B. Sample League," CBS SportsLine.com, www.cbs.sportsline.com, retrieved on Sep. 23, 2002.

"Fantasy Baseball," CBS SportsLine.com, www.baseball101.fantasy.sportsline.com/et al, retrieved on Sep. 24, 2002.

"Fantasy Football," CBS SportsLine.com, www.football2145.fantasy.sportsline.com/et al, retrieved on Mar. 25, 1998; retrieved on Nov. 24, 1999; retrieved on Jan. 26, 2000; retrieved on Sep. 23, 2002; and retrieved on Sep. 24, 2002.

"Fantasy Golf," CBS SportsLine.com, www.golf1.fantasy.sportsline.com/et al, retrieved on Sep. 23, 2002.

"Fantasy Hockey," CBS SportsLine.com, www.baseball2102.fantasy.sportsline.com/et al, retrieved on Sep. 23, 2002 and Sep. 24, 2002.

"Fantasy Racing," CBS SportsLine.com, www.racing.fantasy.sportsline.com/et al, retrieved on Sep. 23, 2002.

"ESPN Fantasy Games," ESPN Internet Ventures, www.games,espn.go.com/cgi/home/request.dll?FRONTPAGE et al., retrieved on Sep. 16, 2002; retrieved on Sep. 17, 2002; and retrieved on Sep. 18, 2002.

"Fantasy Football," Franchise Football League.

"Strat-O-Matic Pro Football," Strat-O-Matic Game Co. Inc.

Schmidt et. al., U.S. Appl. No. 60/778,596, filed Mar. 1, 2006 and incorporated by reference in its entirety by US Pub No. 20070220554.

* cited by examiner

700

800

| | | 8:00 AM | 8:30 AM | 9:00 AM | 9:30 AM | |
|---|---|---|---|---|---|---|
| ESPN | ★ | Program | | | Program | |
| ESPN On-Demand | | Life of Nolan Ryan -- On-Demand | | | | |
| ESPN On-Demand | | Classic Fights -- On-Demand | | | | |
| ESPN On-Demand | | Documentary -- Ali -- On-Demand | | | | |
| Fox Sports | | Program | | Program | | |
| RCN | | Program | | Program | Program | |

1400

Recording Screen

| | | | |
|---|---|---|---|
| ESPN | Soccer | 8:00 AM | ▲ Recorded |
| RCN | Jogging | 5:00 PM | ▲ Recorded |

11/9

| | | | |
|---|---|---|---|
| Fox Sports | Volleyball | 8:00 AM | ▲ Recorded |

11/10

| | | | |
|---|---|---|---|
| ESPN | Football | 9:00 PM | Pending Recording |

11/11

Playlist Screen

| | 11/9 | | |
|---|---|---|---|
| ESPN | Soccer | 8:00 AM | ▲ Recorded |
| RCN | Jogging | 5:00 PM | ▲ Recorded |

| | 11/10 | | |
|---|---|---|---|
| Fox Sports | Volleyball | 8:00 AM | ▲ Recorded |
| RCN On-Demand | Classic Fights | On-Demand PPV | ▲ Purchased |
| ESPN On-Demand | Life of Dale Jared | On-Demand | ▲ Accessed |

Viewing History 11/7

| | | | |
|---|---|---|---|
| 43 min | ESPN | Jogging | 10:00 AM Broadcast |
| 1 hr 5 min | ESPN | Sports Center | 12:00 PM Broadcast |
| 12 min | RCN | Basketball | 1:00 PM ▲ Recorded |
| 35 min | Fox Sports On-Demand | Volleyball | 9:00 AM ▲ Accessed |
| 2 hrs | Fox Sports On-Demand | Classic Fights | On-Demand ▲ Purchased |
| 1 hr | ESPN On-Demand | On-Demand Previews for 11/7/05 | On-Demand Accessed |

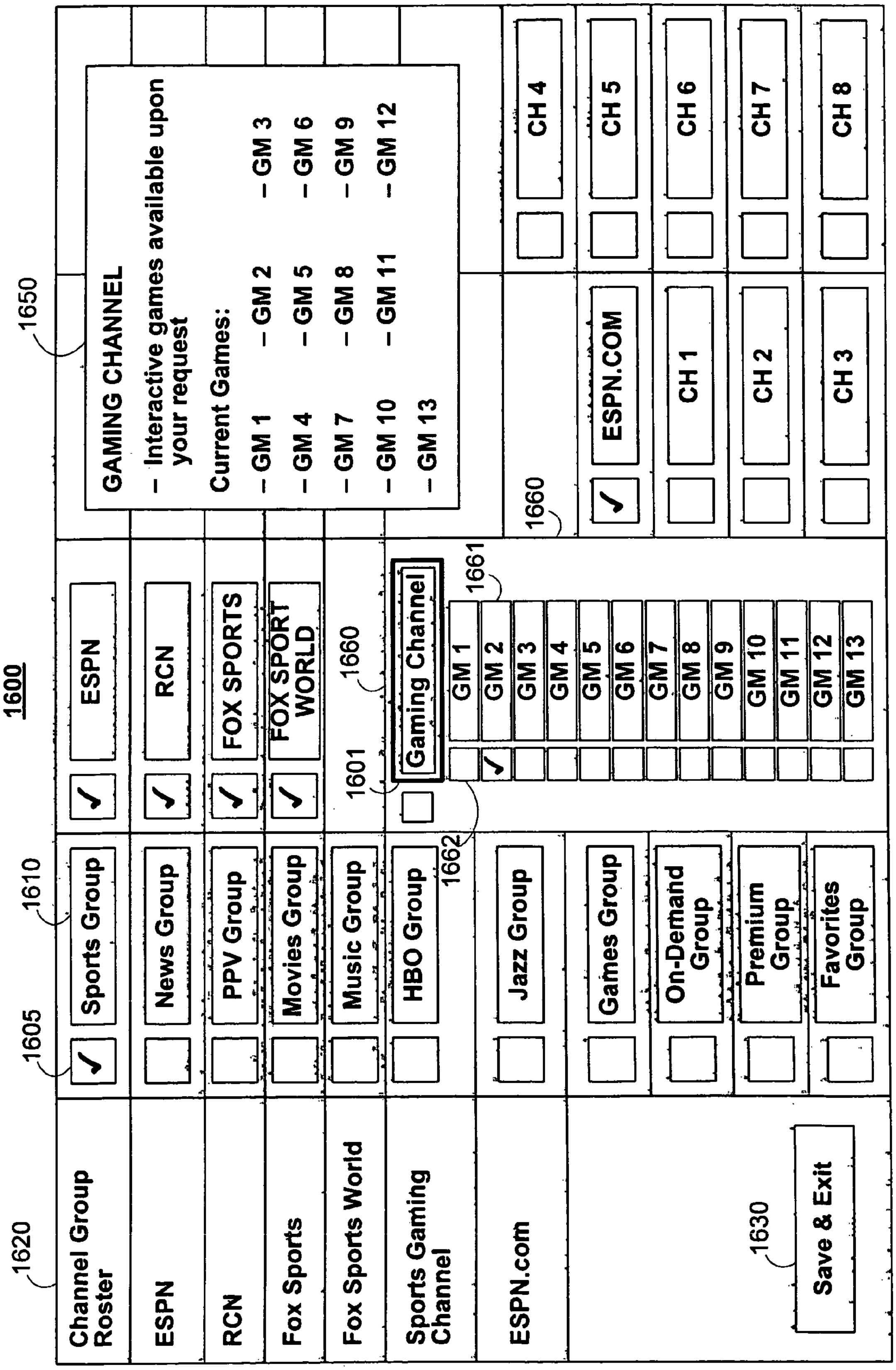

FIG. 16

| Channel Group Roster 1620 | | 1605 1610 | 1600 | | 1650 |
|---|---|---|---|---|---|
| ESPN | ✓ | Sports Group | ESPN | | **GAMING CHANNEL** — Interactive games available upon your request |
| RCN | ☐ | News Group | RCN | ✓ | Current Games: |
| Fox Sports | ☐ | PPV Group | FOX SPORTS | ✓ | – GM 1   – GM 2   – GM 3 |
| Fox Sports World | ☐ | Movies Group | FOX SPORT WORLD | ✓ | – GM 4   – GM 5   – GM 6 |
| Sports Gaming Channel | ☐ | Music Group | 1601 Gaming Channel 1661 | ☐ 1660 | – GM 7   – GM 8   – GM 9 |
| ESPN.com | ☐ | HBO Group 1662 | GM 1 ✓ | | – GM 10  – GM 11  – GM 12 |
| | ☐ | Jazz Group | GM 2 | | – GM 13 |
| | ☐ | Games Group | GM 3 | | |
| | ☐ | On-Demand Group | GM 4 | | 1660 |
| | ☐ | Premium Group | GM 5 | | ESPN.COM ✓   CH 1 ☐   CH 4 ☐ |
| | ☐ | Favorites Group | GM 6 | | CH 2 ☐   CH 5 ☐ |
| 1630 Save & Exit | | | GM 7 | | CH 3 ☐   CH 6 ☐ |
| | | | GM 8 | | CH 7 ☐ |
| | | | GM 9 | | CH 8 ☐ |
| | | | GM 10 | | |
| | | | GM 11 | | |
| | | | GM 12 | | |
| | | | GM 13 | | |

SYSTEMS AND METHODS FOR PROVIDING CHANNEL GROUPS IN AN INTERACTIVE MEDIA GUIDANCE APPLICATION

BACKGROUND OF THE INVENTION

This invention relates to interactive media systems, and more particularly, to interactive media guidance applications that provide a user interface for receiving information about and requesting access to media. In particular, the present invention relates to providing groups of media channels in an interactive media guidance application to enable improved user guidance and functionality in the guidance application.

Media delivery systems, such as cable, satellite, and broadcast television systems, the Internet, and satellite radio systems, provide users with a large number of media channels, such as television channels, radio stations, and Internet web sites. These media channels provide programming in a number of different media, such as video programming (e.g., broadcast television programming, on-demand video programming), audio programming (e.g., music channels, audio-on-demand programming), and interactive applications (e.g., games and shopping applications). In view of the myriad media channels provided to users, interactive media guidance applications are needed to provide a user-friendly interface that organizes information, such as media listings, enable access to the media programming, and provide other advanced functions that improve the user's media experience.

A common type of interactive media guidance application is a television program guide application, which is typically implemented on a user set-top box. Such program guides allow users to view program listings for multiple television channels in different display formats. For example, a user may instruct the program guide to display a grid or table of program listings organized in a channel-ordered or a time-ordered list. Users may also search and sort program listings by genre (e.g., movies, sports, etc.) or by title (i.e., alphabetically). A user may obtain additional information for a program by placing a highlight region on a desired program listing and pressing an information request button. The user may set a television channel as a favorite channel, lock access to a program or channel, and purchase a pay program or pay channel from the program guide. The user may select a program for recording or set a reminder to watch a program. However, with the advent of other types of platforms for accessing media programming (e.g., personal digital assistants, personal media players, cellular phones, personal computers, gaming platforms), the need for media guidance now extends beyond television and television program guides. Interactive media guidance applications are now implemented on any platform that enables the user to access media programming. Even in television systems, the type of media programming provided is no longer limited to television programming, and interactive television program guides now also provide guidance for other types of media programming (e.g., music programming, interactive gaming applications, etc.).

With so many media channels available to the user, what is needed is a sophisticated approach for organizing media channels, media listings, and descriptive information in an interactive media guidance application such that the user is more easily and naturally guided to media programming of interest to the user.

Therefore, it would be desirable to provide an interactive media guidance application that focuses the user's attention on a group of media channels, that provides focused information on a group of media channels, and that executes a function of the guidance application on a group of media channels.

SUMMARY OF THE INVENTION

These and other objects of the invention are accomplished in accordance with the principles of the present invention by providing an interactive media guidance application that provides channel groups.

A definition of a channel group may include a plurality of media channels. The channel group definition (also referred to as the channel group roster) may also include individual media listings. The media channels belonging to a channel group (also referred to as group channels) and any individual media listings belonging to the channel group may share at least one common characteristic around which the channel group is organized. A channel group may be organized around any distinguishable characteristic of a media channel or of a media listing. For example, channel groups may be organized around programming content, tier of service (e.g., cable, premium), media type (e.g., video, audio, interactive), etc. Channel group rosters may be populated using human editorial judgment independent of any objective criteria. Channel groups may be organized by the user or by the system (e.g., by the service provider or the guidance application). The system may utilize user profile information (e.g., on which media channels and programming are accessed by the user) to determine the channel groups to be provided to the user and their group rosters. The guidance application may enable the user to create a channel group by selecting the media channels and media listings for the channel group roster and may also enable the user to edit channel group rosters initially set by the system.

The guidance application may provide the user with information on the channel group, such as information on the common characteristic for the channel group, and video clips promoting the channel group and its programming. The guidance application may also provide the user with the channel group roster, media listings for the group channels (e.g., broadcast television programs, on-demand programs, pay-per-view programs), a list of viewing reminders, pending and finished recordings, and purchased programming from the group channels, and a viewing history of programming previously accessed by the user through the group channels. The guidance application may also provide the user with a reduced scale video of live group channel broadcasts and other media programming sourced from the group channels (e.g., recorded programming, on-demand programming).

The guidance application may also enable the user to focus the functions of the guidance application on one or more selected channel groups. The guidance application may enable the user to initiate a guidance application function (e.g., set as favorite, lock, purchase) on one or more selected channel groups. In response, the guidance application may execute the function on the media channels of the selected channel groups (e.g., set all the group channels as favorite channels, lock all the group channels, and purchase all the group channels). The guidance application may execute the function on the media listings included in the selected channel groups (e.g., lock the media listings, purchase the media listings).

Further features of the invention, its nature and various advantages will be more apparent from the accompanying drawings and the following detailed description of the preferred embodiments.

BRIEF DESCRIPTION OF THE FIGURES

FIG. 16 shows an illustrative channel group roster edit screen in accordance with the present invention.

DETAILED DESCRIPTION OF THE PREFERRED EMBODIMENTS

Figure 1:
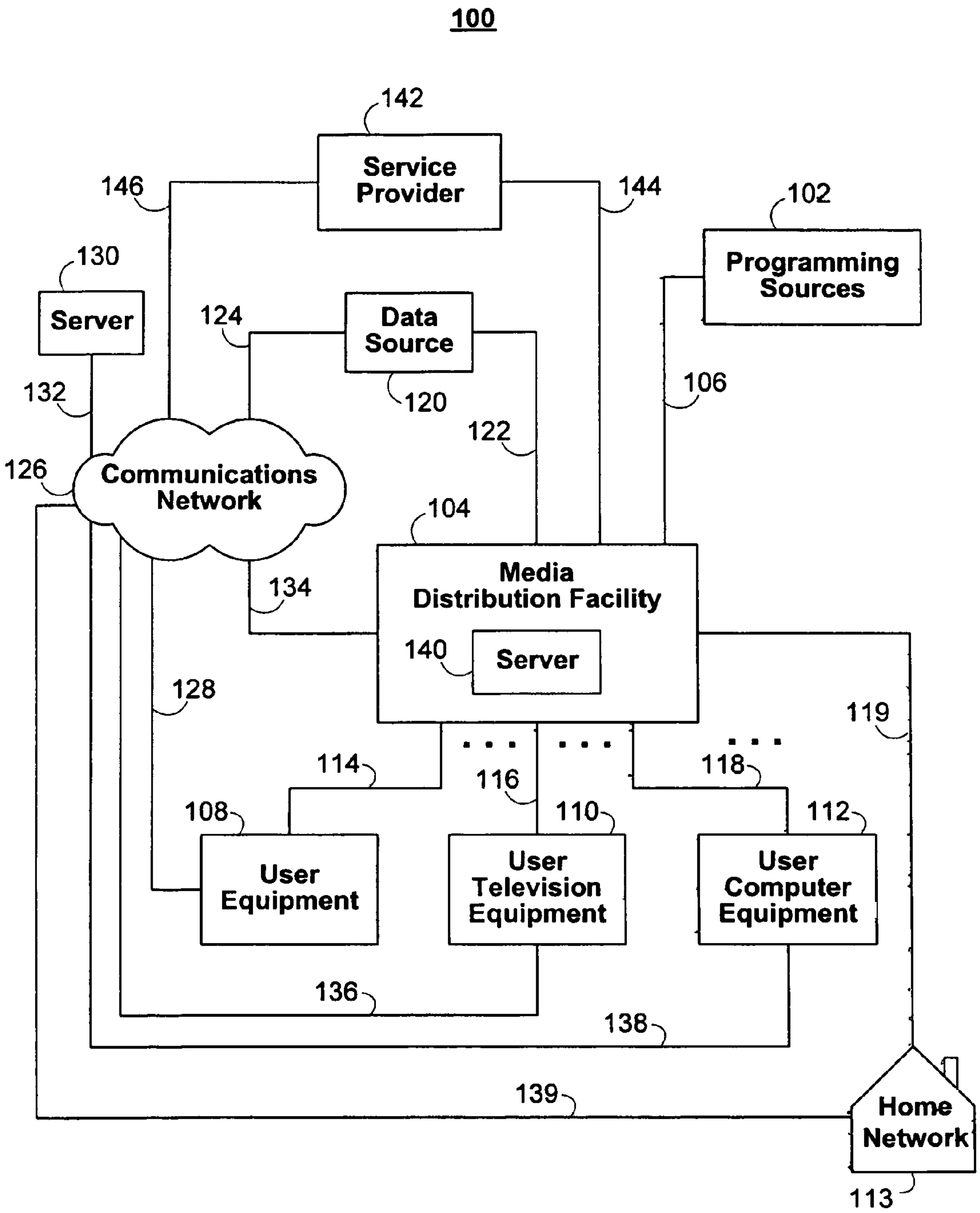
FIG. 1 is a diagram of an illustrative interactive television system in accordance with the present invention.

The amount of media available to users in any given media delivery system can be substantial. Consequently, many users desire a form of media guidance—an interface that allows users to efficiently navigate media selections and easily identify media that they may wish to access. An application which provides such guidance is referred to herein as an interactive media guidance application or, sometimes, a guidance application.

Interactive media guidance applications may take various forms depending on the media for which they provide guidance. One common type of media guidance application is an interactive television program guide. Interactive television program guides are well-known guidance applications that, among other things, allow users to navigate among and locate television programming choices and, in some systems, digital music. The media programming (e.g., television and music) organized by an interactive television program guide may be provided via traditional broadcast, cable, satellite, or any other suitable communications channel. The media programming may be provided on a subscription basis, as pay-per-view programs, and may be provided on-demand upon user request (e.g., video-on-demand (VOD) systems). The media programming provided on a subscription basis may be organized into tiers of service by a provider. For example, a group of basic cable television channels may be authorized for user access in return for a monthly fee. Additional premium channels such as HBO, Showtime, and Cinemax may be authorized individually, or as part of a package, in return for additional monthly fees. Subscription programming may also include media channels that are normally broadcast over the air free of charge. On-demand media programming may be provided to users as part of a subscription service or may be purchased upon user request (e.g., pay-per-view on-demand programming).

With current systems, media programming may be provided through a myriad of media channels. Some media channels are organized around a central content theme, such as news, sports, movies, music, etc. Some media channels specialize in a particular medium, such as digital music channels that concentrate primarily on audio programming. Some media channels share a common media programmer. For example, the media programmer HBO may provide programming for a number of media channels such as HBO, HBO Signature, HBO Family, etc. Some media channels are local affiliates of a national network of media channels (e.g., NBC, ABC, CBS, FOX) that provide a mix of national network programming and local programming. Some media channels are national cable channels (e.g., DISCOVERY, TNT, FX) that uniformly provide the same media programming across the nation. Some media channels are only locally available in certain geographic locations (e.g., local public access channels).

In addition to providing guidance on the programming available through the myriad of media channels, interactive television program guides also provide other functionalities to aid the user in the enjoyment of media programming. For example, the interactive program guide may enable the user to block access to programming that is inappropriate for children using a pass code. The guide may enable the user to set favorite channels and receive targeted information on the favorite channels. The guide may enable the user to authorize or purchase access to media channels or programming that require payment (e.g., subscribe to a premium channel or order a pay-per-view program).

Although the foregoing generally refers to television program guides, it should be understood that, with the advent of the Internet, mobile computing, and high-speed wireless networks (which allow users to access media on non-television devices such as cell phones), interactive media guidance applications are not limited to television program guides. Non-television-centric platforms (i.e., platforms that distribute media with equipment that is not part of the user's television delivery network) allow users to locate and access a mix of media, which may include video clips, full motion videos (which may include television programming), images, audio, interactive applications (e.g., games and shopping applications), Internet web sites, and other suitable media. Consequently, media guidance is also necessary on modern non-television-centric platforms (e.g., cell phones, personal digital assistants (PDAs), Blackberrys, etc).

Interactive media guidance applications may be provided as online applications (i.e., provided on a web site) on a personal computer, or as stand-alone applications or clients on hand-held computers, PDAs, or cellular telephones. In some systems, users may control equipment remotely via an interactive media guidance application. For example, users may access an online media guidance application and set recordings or other settings on their in-home media equipment. This may be accomplished by the online guide controlling the user's home equipment directly or via another media guidance application that runs on the user's home equipment.

The present invention relates to an interactive media guidance application that provides channel groups for media channels (e.g., broadcast television channels, audio channels, on-demand media channels, interactive game channels, Internet web sites). The media channels belonging to a channel group (i.e., the group channels) may share at least one common characteristic around which the channel group is organized. For example, media channels dedicated to a common type of content may be grouped together. Channel groups may be organized around other channel characteristics such as tier of service (e.g., the status of a media channel as a free broadcast channel, a basic cable channel, or a premium channel), type of service (e.g., whether a media channel is a subscription channel, on-demand channel, or pay-per-view channel), programmer identity (e.g., whether the media channel is provided by a common programmer such as HBO or DISCOVERY), channel authorization (e.g., whether the user is authorized to receive the media channel), parental control setting (e.g., whether the user has selected the channel for parental control), channel origination (e.g., whether a media channel originates from a cable network, a broadcast network, is unaffiliated, or is local only), favorite channel status (e.g., whether the user has set the channel as a favorite channel), type of media (e.g., whether the channel is a television channel, an audio channel, or an interactive application channel), etc.

It should be understood that the above examples of common channel characteristics are only illustrative and are not exhaustive. The system (e.g., the service provider) may use any characteristic of a media channel to organize a channel group. It should also be understood that individual media listings may also be included in a channel group roster. For example, the service provider may organize a channel group around a common characteristic (e.g., sports content) shared by both media channels and individual media listings. It should also be understood that the system may populate a channel group roster without strict adherence to any objective criteria (e.g., shared characteristic) and may exercise editorial control over the channel group roster. The system (e.g., the service provider) may utilize user profile information to organize channel groups and populate their rosters. For example, the service provider may use profile information on the media channels most accessed by a user to create a channel group filled with only those channels. The guidance application may enable the user to create a channel group by selecting the media channels (and individual media listings) for the channel group roster and may also enable the user to edit channel group rosters initially set by the system.

The guidance application of the present invention provides information on channel groups to better guide the user through the myriad of media channels and listings available in current systems. In one aspect, the guidance application may provide the user with information on the channel group itself. For example, the guidance application may provide information on the common characteristic for the channel group, promotional information describing the channel group in a manner enticing to the user (e.g., a video clip promoting the channel group), and promotional information on programming offered through the group channels. The guidance application may also provide the user with the channel group roster, media listings for the group channels (e.g., broadcast television programs, on-demand programs, pay-per-view programs), a list of viewing reminders, pending and finished recordings, purchased programming and previously accessed programming from the channel group. The guidance application may also provide the user with a reduced scale video of live group channel broadcasts and other media programming sourced from the group channels (e.g., recorded programming, on-demand programming).

In addition to providing information on the channel groups, the guidance application of the present invention enables the user to focus the functions of the guidance application on one or more selected channel groups and the media channels of the channel groups. For example, the guidance application enables the user to initiate a guidance application function (e.g., set as favorite, lock, purchase) on one or more selected channel groups. In response to the user indication, the guidance application may execute the guide function on the channel group rosters of the one or more selected channel groups (i.e., all the media channels and listings belonging to the channel groups). In one embodiment, access to information on a channel group and guide functions that are executable on the channel group are concentrated in one guidance application display screen to create a portal-type guide experience for the user.

An illustrative interactive media guidance system 100 in accordance with the present invention is shown in FIG. 1. System 100 is intended to illustrate a number of approaches by which media of various types, and guidance for such media, may be provided to (and accessed by) end-users. The present invention, however, may be applied in systems employing any one or a subset of these approaches, or in systems employing other approaches for delivering media and providing media guidance.

A first approach represents a typical television-centric system in which users may access television (and, in some systems, music) programming. This includes programming sources 102 and distribution facility 104. Media such as television programming and digital audio may be provided from programming sources 102 to media distribution facilities, such as distribution facility 104, using communications path 106. Communications path 106 may be a satellite path, a fiber-optic path, a cable path, any other suitable wired or wireless communications path, or a combination of such paths.

Programming sources 102 may be any suitable sources of television and audio programming, such as television broadcasters (e.g., NBC, ABC, and HBO) or other television or audio programming production studios. Programming sources 102 may provide television programming in a variety of formats in high definition and standard definition, such as, for example, 1080p, 1080i, 720p, 480p, 480i, and any other suitable format.

Distribution facility 104 may be a cable system headend, a satellite media distribution facility, a television broadcaster, or any other suitable facility for distributing video media (e.g., through television channels, video-on-demand channels, pay-per-view channels) and audio media (e.g., through analog or digital music channels) to the user equipment. In some approaches, distribution facility 104 may also distribute other media to users, such as video and audio clips, web pages, and interactive applications (e.g., games, shopping applications), that may be offered to subscribers of a given cable or satellite system. There are typically numerous media distribution facilities 104 in system 100, but only one is shown in FIG. 1 to avoid overcomplicating the drawing.

Distribution facility 104 may be connected to various user equipment devices 108, 110, and 112. Such user equipment devices may be located, for example, in the homes of users. User equipment devices may include user television equipment 110, user computer equipment 112, or any other type of user equipment suitable for accessing media (e.g. television and music programming, web pages, etc.) or interactive media guidance application functions. User equipment 108 may be any type of user equipment (e.g., user television equipment, user computer equipment, etc.) and, for simplicity, user equipment devices may be referred to generally as user equipment 108.

User equipment devices 108, 110, and 112 may receive media programming (e.g., television programming from television channels) and other data from distribution facility 104 over communications paths, such as communications paths 114, 116, and 118. User equipment devices 108, 110, 112 may also transmit signals to distribution facility 104 over paths 114, 116, and 118. Paths 114, 116, and 118 may be cables or other wired connections, free-space connections (e.g., for broadcast or other wireless signals), satellite links, or any other suitable links or combination of links.

A second approach illustrated in FIG. 1 by which media and media guidance are provided to end users is a non-television-centric approach. In this approach media such as video (which may include television programming from television channels), audio, images, web pages, are provided to user equipment 108 by server 130 via communications network 126. This approach is non-television-centric because media is provided by, and delivered at least partially to, and sometimes exclusively to, equipment that is not part of users' traditional television delivery system. In non-television-centric approaches, television programming may not be included among the media provided to the user and, even when included, may only represent one medium among a plurality of media.

In some embodiments for this approach, communications network 126 is the Internet. Server 130 may provide, for example, a web site that is accessible to the user's equipment and an on-line guidance application for the user. In such approaches, the user's equipment may be, for example, a personal computer or a hand-held device such as a PDA or web-enabled cellular telephone that incorporates a web browser. In other embodiments, server 130 uses the Internet as a transmission medium but does not use a web browser or web sites. In such approaches, the user's equipment may run a client application that enables the user to access media. In other approaches, communications network 126 is a private communications network, such as a cellular phone network, that does not include the Internet. In yet other approaches, communications network 126 includes a private communications network and the Internet. For example, a cellular telephone or other mobile-device service provider may provide Internet access to its subscribers via a private communications network, and may provide media such as video clips or television programming to its subscribers via the Internet and its own network.

The aforementioned approaches for providing media may, in some embodiments, be combined. For example, a distribution facility 104 may provide a television-centric media delivery system, while also providing users' equipment (e.g., 108, 110 and 112) with access to other non-television-centric delivery systems provided by server 130. For example, a user's equipment may include a web-enabled set-top box or a television enabled personal computer. Distribution facility 104 may, in addition to television and music programming, provide the user with Internet access whereby the user may access server 130 via communications network 126. Distribution facility 104 may communicate with communications network 126 over any suitable path 134, such as a wired path, a cable path, fiber-optic path, satellite path, or combination of such paths.

Media guidance applications may be provided using any approach suitable for the type of media and distribution system for which the guidance applications are used. Media guidance applications may be, for example, stand alone applications implemented on users' equipment. In other embodiments, media guidance applications may be client-server applications where only the client resides on the users' equipment. In still other embodiments, guidance applications may be provided as web sites accessed by a browser implemented on the users' equipment. Whatever the chosen implementation, the guidance application will require information about the media for which it is providing guidance. For example, information on media programming (e.g., title, channel, and time), media channels (e.g., channel characteristics), and channel groups (e.g., group roster) may be necessary to guide users to desired media programming.

In some television-centric embodiments, for example, the guidance application may be a stand-alone interactive television program guide that receives program guide data via a data feed (e.g., a continuous feed, trickle feed, or data in the vertical blanking interval of a channel). Data source 120 in system 100 may include a program listings database that is used to provide the user with television program related information such as scheduled broadcast times, titles, channels, ratings information (e.g., parental ratings and critic's ratings), detailed title descriptions, genre or category information (e.g., sports, news, movies, etc.), program format (e.g., standard definition, high definition), related video clips, etc. Data source 120 may also include information on television channels (e.g., channel name and type) and channel groups (e.g., channel group roster, video clip promoting a channel group, information on programming from the channel group that is to be featured). Data source 120 may also be used to provide advertisements (e.g., program guide advertisements and advertisements for other interactive television applications), real-time data such as sports scores, stock quotes, news data, and weather data, application data for one or more media guidance applications or other interactive applications, and any other suitable data for use by system 100. As another example, data source 120 may provide data indicating the types of information that may be included in interactive media guidance overlays (e.g., at the request of the user, absent user modification, etc.).

Program guide data may be provided to user equipment, including user equipment located on home network 113, using any suitable approach. For example, program schedule data and other data may be provided to the user equipment on a television channel sideband, in the vertical blanking interval of a television channel, using an in-band digital signal, using an out-of-band digital signal, or by any other suitable data transmission technique. Program schedule data and other data may be provided to user equipment on multiple analog or digital television channels. Program schedule data and other data may be provided to the user equipment with any suitable frequency (e.g., continuously, periodically, daily, in response to a request from user equipment, etc.).

In some television-centric embodiments, guidance data from data source 120 may be provided to users' equipment using a client-server approach. For example, a guidance application client residing on the user's equipment may initiate sessions with server 140 to obtain guidance data when needed.

There may be multiple data sources (such as data source 120) in system 100, although only one data source is shown in FIG. 1 to avoid overcomplicating the drawing. For example, a separate data source may be associated with each of a plurality of media channels or channel groups and may provide data that is specific to the media channel or channel group (e.g., media programming listings for the channel or channel group, advertisements for programming of the channel or channel group, logo data for displaying the media channel or channel group's logo in program guide display screens, etc.). Data source 120 and any other system components of FIG. 1 may be provided using equipment at one or more locations. Systems components are drawn as single boxes in FIG. 1 to avoid overcomplicating the drawings.

Data source 120 may provide data to distribution facility 104 over communications path 122 for distribution to the associated user equipment and home network 113 (discussed below) over paths 114, 116, 118, and 119 (e.g., when data source 120 is located at a main facility). Communications path 122 may be any suitable communications path such as a satellite communications path or other wireless path, a fiber-optic or other wired communications path, a path that supports Internet communications, or other suitable path or combination of such paths.

In some television-centric and non-television centric approaches, data source 120 may provide guidance data directly to user equipment 108 over path 124, communications network 126, and path 128 (e.g., when data source 120 is located at a facility such as one of programming sources 102). In some embodiments of the present invention, data source 120 may provide guidance data directly to user equipment located on home network 113 (discussed below) over path 124, communications network 126, and path 139 (e.g., when data source 120 is located at a facility such as one of programming sources 102). Paths 124, 128, and 139 may be wired paths such as telephone lines, cable paths, fiber-optic paths, satellite paths, wireless paths, any other suitable paths or a combination of such paths. Communications network 126 may be any suitable communications network, such as the Internet, a public switched telephone network, or a packet-based network.

User equipment devices, including user equipment devices located on home network 113 (discussed below), such as user television equipment and personal computers, may use media programming schedule data and other interactive media guidance application data to display media listings (e.g., television program listings) and other information (e.g., information on digital music) to the user. An interactive television program guide application or other suitable interactive media guidance application may be used to display the information on the user's display (e.g., in one or more overlays that are displayed on top of video for a given television channel). Interactive displays may be generated and displayed for the user using any suitable approach. In one suitable approach, distribution facility 104, server 130, or another facility, may generate guidance application display screens and may transmit the display screens to user equipment for display. In another suitable approach, user equipment may store data for use in one or more interactive displays (e.g., media programming schedule data, advertisements, logos, etc.), and an interactive media guidance application implemented at least partially on the user equipment may generate the interactive displays based on instructions received from distribution facility 104, server 130 or another facility. In some embodiments of the present invention, user equipment may store only the data that is used to generate the interactive guidance application displays (e.g., storing logo data for a particular television broadcaster only when the logo is to be included in one or more interactive displays). In some embodiments of the present invention, user equipment may store data that is not necessarily used to generate the interactive displays (e.g., storing advertisements associated with a particular media channel that may or may not be displayed). Any other suitable approach or combination of approaches may be used to generate and display interactive overlays for the user.

In still other embodiments, the interactive media guidance application (television-centric and non-television centric) may be provided online as, for example, a website. For example, server 130 may provide an online interactive television program guide. As another example, user equipment 108 may be a mobile device, such as a cellular telephone or personal digital assistant (PDA). The mobile device may be web-enabled to allow the user to access an on-line guidance application (which may be modified from its original version to make it appropriate for a smaller display). Alternatively, the mobile device may have an applet that communicates with server 130 to obtain guidance data via the Internet.

Server 130 may receive program schedule data and other data from data source 120 via communications path 124, communications network 126, and communications path 132 or via another suitable path or combination of paths. Path 132 may be a satellite path, fiber-optic path, wired path, or any other path or combination of paths. User equipment 108 may access the online interactive media guidance application and other sources from server 130 via communications path 128. User equipment 108 may also access the guidance application and other services on server 130 via communications path 114, distribution facility 104, and communications path 134. For example, a cable modem or other suitable equipment may be used by user equipment 108 to communicate with distribution facility 104.

User equipment such as user television equipment 110, user computer equipment 112, and user equipment located on home network 113 may access the online interactive media guidance application and server 130 using similar arrangements. User television equipment 110 may access the on-line interactive media guidance application and server 130 using communications path 136 or using path 116, distribution facility 104, and path 134. User computer equipment 112 may access the on-line interactive media guidance application and server 130 using communications path 138 or using path 118, distribution facility 104, and path 134. User equipment located on home network 113 may access the on-line media guidance application and server 130 using communications path 139 or using path 119, distribution facility 104, and path 134. Paths 136, 138, and 139 may be any suitable paths such as wired paths, cable paths, fiber-optic paths, wireless paths, satellite paths, or a combination of such paths.

In some embodiments, system 100 may support other interactive applications in addition to the interactive media guidance applications. Such applications may be implemented using any suitable approach. For example, the interactive applications may be implemented locally on the user equipment or in a distributed fashion (e.g., using a client-server architecture in which the user equipment serves at least partly, and for at least some of the time, as the client and a server, such as server 140 at distribution facility 104, server 130, or other suitable equipment acts as the server). Other distributed architectures may also be used if desired. Moreover, some or all of the features of the interactive applications of system 100 (including the media guidance application) may be provided using operating system software or middleware software. Such operating system software and middleware may be used instead of, or in combination with, application-level software. In yet other approaches, interactive applications may also be supported by servers or other suitable equipment at one or more service providers such as service provider 142. Regardless of the particular arrangement used, the software that supports these features may be referred to as an application or applications.

For example, an interactive application such as a home shopping service may be supported by a service provider such as service provider 142 that has sales representatives, order fulfillment facilities, account maintenance facilities, and other equipment for supporting interactive home shopping features. A home shopping application that is implemented using the user equipment may be used to access the service provider to provide such features to the user. The user equipment may access service provider 142 via distribution facility 104 and communications path 144 or via communications network 126 and communications path 146. Communications paths such as paths 144 and 146 may be any suitable paths such as wired paths, cable paths, fiber-optic paths, satellite paths, or a combination of such paths.

If desired, an interactive media guidance application such as a network-based video recorder or a video-on-demand application (e.g., as accessed through a video-on-demand channel) may be supported using server 140, server 130, or equipment at service provider 142. Video-on-demand content and video recorded using a network-based video recorder arrangement may be stored on server 140 or server 130 or at service provider 142 and may be provided to the user equipment when requested by users. An interactive television program guide, for example, may be used to support the functions of a personal video recorder (sometimes called a digital video recorder) that is implemented using user equipment 108. Illustrative equipment that may be used to support personal video recorder functions include specialized personal video recorder devices, integrated receiver decoders (IRDs), set-top boxes with integrated or external hard drives, or personal computers with video recording capabilities.

Interactive applications such as media guidance applications (e.g., interactive television program guide applications and video-on-demand applications), home shopping applications, home banking applications, game applications, and other applications (e.g., applications related to e-mail and chat or other communications functions, etc.) may be provided as separate applications that are accessed through a navigation shell application (i.e., a menu application with menu options corresponding to the applications). The features of such applications may be combined. For example, games, video-on-demand services, home shopping services, network-based video recorder functions, personal video recorder functions, navigational functions, program guide functions, communications functions, and other suitable functions may be provided using one application or any other suitable number of applications. The one or more applications may display various overlays on user equipment including, for example, interactive television information on top of video for a given television channel.

Interactive television program guide applications, home banking applications, home shopping applications, network-based video recorder and personal video recorder applications, video-on-demand applications, gaming applications, communications applications, and navigational applications are only a few illustrative examples of the types of interactive media guidance and other applications that may be supported by system 100. Other suitable interactive applications that may be supported include news services, web browsing and other Internet services, and interactive wagering services (e.g., for wagering on horse races, sporting events, and the like). Interactive overlays that are displayed by these applications may also be customized in accordance with the present invention.

Users may have multiple types of user equipment by which they access media and obtain media guidance. For example, some users may have home networks that are accessed by in-home and mobile devices. As shown in FIG. 1, home network 113 communicates with distribution facility 104 and server 130 over paths 119 and 139 (and, in the case of server 130, communications network 126). Such home networks 113 may be located, for example, in homes of users or distributed, for example, among homes of users. Home networks 113 may each include a plurality of interconnected user equipment devices, such as, for example user equipment devices 108, 110 and 112. In some embodiments, users may control in-home devices via a media guidance application implemented on a remote device. For example, users may access an online media guidance application on a website via a personal computer at their office, or a mobile device such as a PDA or web-enabled cellular telephone. The user may set settings (e.g., recordings, reminders, or other settings) on the on-line guidance application to control the user's in-home equipment. The on-line guide may control the user's equipment directly, or by communicating with a media guidance application on the user's in-home equipment.

Figure 2:
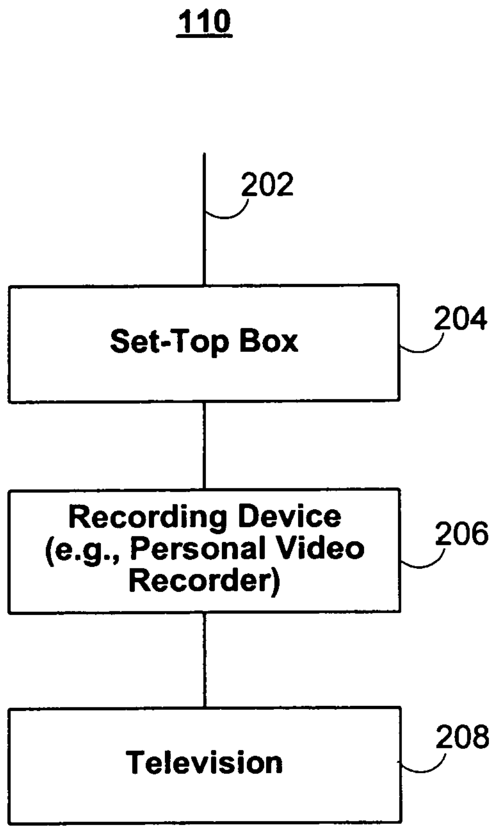
FIG. 2 is a diagram of illustrative user television equipment in accordance with the present invention.

FIGS. 2-6 show illustrative arrangements for user equipment. An illustrative set-top box-based arrangement for user television equipment 110 is shown in FIG. 2. User television equipment 110 may be stand-alone or a part of home network 113 (FIG. 1). Input/output 202 may be connected to communications paths such as paths 116 and 136 (FIG. 1). Input/output functions may be provided by one or more wires or communications paths, but are shown as a single path in FIG. 2 to avoid overcomplicating the drawing. Television programming, program guide data, and any other suitable interactive media guidance application data or other data may be received using input/output 202. Commands and requests and other data generated as a result of user interactions with the interactive media guidance application may also be transmitted over input/output 202.

Set-top box 204 may be any suitable analog or digital set-top box (e.g., a cable set-top box). Set-top box 204 may contain an analog tuner for tuning to a desired analog television channel (e.g., a channel comprising television programming, interactive television data, or both). Set-top box 204 may also contain digital decoding circuitry for receiving digital television channels (e.g., channels comprising television or music programming, interactive television data, etc.). Set-top box 204 may also contain a high-definition television tuner for receiving and processing high-definition television channels. Analog, digital, and high-definition channels may be handled together if desired. Multiple tuners may be provided (e.g., to handle simultaneous watch and record functions or picture-in-picture (PIP) functions). Box 204 may be an integrated receiver decoder (IRD) that handles satellite television. If desired, box 204 may have circuitry for handling cable, over-the-air broadcast, and satellite content.

Set-top box 204 may be configured to output media programming, such as television programs, in a preferred format. Because television programs may be received in a variety of formats, set-top box 204 may contain scaler circuitry for upconverting and downconverting television programs into the preferred output format used by set-top box 204. For example, set-top box 204 may be configured to output television programs in 720p. In this example, the scaler circuitry may upconvert standard-definition television programs having 480 lines of vertical resolution to 720p format and downconvert certain high-definition television programs having 1080 lines of vertical resolution to 720p format.

Box 204 may include a storage device (e.g., a digital storage device such as a hard disk drive) for providing recording capabilities. Box 204 may also be connected to a recording device 206 such as a video cassette recorder, personal video recorder, optical disc recorder, or other device or devices with storage capabilities. Box 204 may be configured to record standard-definition television programs, high-definition television programs, digital music programming, and other media data (e.g., photographs).

Set-top box 204 contains a processor (e.g., a microcontroller or microprocessor or the like) that is used to execute software applications. Set-top box 204 may contain memory such as random-access memory for use when executing applications. Nonvolatile memory may also be used (e.g., to launch a boot-up routine and other instructions). Hard disk storage in box 204 or in recording device 206 may be used to back up data and to otherwise support larger databases and storage requirements than may be supported using random-access memory approaches. Hard disk storage in box 204 or in recording device 206 may also be used to store and back up program guide settings or saved user preferences.

Set-top box 204 may have infrared (IR) or other communications circuitry for communicating with a remote control or wireless keyboard. Set-top box 204 may also have dedicated buttons and a front-panel display. The front-panel display may, for example, be used to display the current channel to which the set-top box is tuned.

Set-top box 204 may also have communications circuitry such as a cable modem, an integrated services digital network (ISDN) modem, a digital subscriber line (DSL) modem, a telephone modem, or a wireless modem for communications with other equipment. Such communications may involve the Internet or any other suitable communications networks or paths. If desired, the components of set-top box 204 may be integrated into other user equipment (e.g., a television or videocassette recorder).

Recording device 206 may be used to record media data provided by set-top box 204. For example, if set-top box 204 is tuned to a given television channel, the video signal for that television channel may be passed to recording device 206 for recording on a videocassette, compact disc, digital video disk, or internal hard drive or other storage device. Recording device 206 may be configured to record either standard-definition television programs, high-definition television programs, digital music programming, or other suitable media data. Recording device 206 may have communications circuitry such as a cable modem, an ISDN modem, a DSL modem, or a telephone modem for communications with other equipment. Such communications may involve the Internet or any other suitable communications networks or paths. The components of recording device 206 may be integrated into other user equipment (e.g., a television, stereo equipment, etc.).

Recording device 206 may be controlled using a remote control or other suitable user interface. If desired, video recorder functions such as start, stop, record and other functions for device 206 may be controlled by set-top box 204. For example, set-top box 204 may control recording device 206 using infrared commands directed toward the remote control inputs of recording device 206 or set-top box 204 may control recording device 206 using other wired or wireless communications paths between box 204 and device 206.

The output of recording device 206 may be provided to television 208 for display to the user. In some embodiments, television 208 may be capable of displaying high-definition programming (i.e., HDTV-capable). If desired, multiple recording devices 206 or no recording device 206 may be used. If recording device 206 is not present or is not being actively used, the video signals from set-top box 204 may be provided directly to television 208. Any suitable television or monitor may be used to display the video. In the equipment of FIG. 2 and the other equipment of system 100 (FIG. 1), the audio associated with various video items is typically distributed with those video items and is generally played back to the user as the videos are played. In some embodiments, the audio may be distributed to a receiver (not shown), which processes and outputs the audio via external speakers (not shown).

Figure 3:
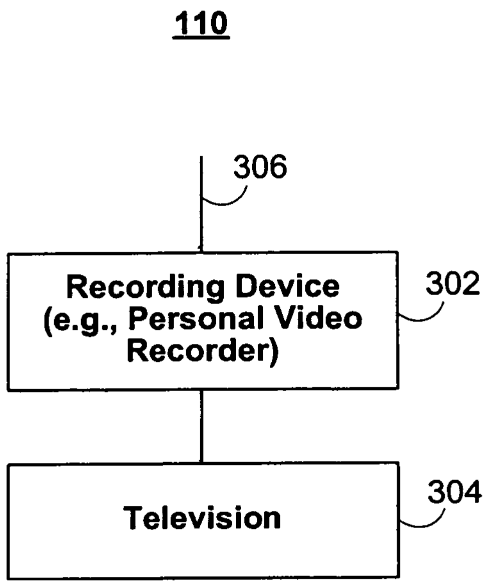
FIG. 3 is a diagram of additional illustrative user television equipment in accordance with the present invention.

Another illustrative arrangement for user television equipment 110 (FIG. 1) is shown in FIG. 3. User-television equipment 110 may be stand-alone or a part of home network 113 (FIG. 1). In the example of FIG. 3, user television equipment 110 includes a recording device 302 such as a digital video recorder (e.g., a personal video recorder (PVR)) that uses a hard disk or other storage for recording video. Recording device 302 may alternatively be a digital video disc recorder, compact disc recorder, videocassette recorder, or other suitable recording device. Equipment 110 of FIG. 3 may also include a television 304. In some embodiments, television 304 may be HDTV-capable. Input/output 306 may be connected to communications paths such as paths 116 and 136 (FIG. 1). Television programming, program schedule data, and other data (e.g., advertisement data, data indicating one or more television channels for which the display of an overlay is to be customized, etc.) may be received using input/output 306. Commands and requests and other data from the user may be transmitted over input/output 306.

Recording device 302 may contain at least one analog tuner for tuning to a desired analog television channel (e.g., to display video for a given television channel to a user, to receive media guidance application data and other data). Recording device 302 may also contain digital decoding circuitry for receiving digital television programming, music programming, media guidance application data (e.g., programming schedule data), and other data on one or more digital channels. Recording device 302 may also contain circuitry for receiving high-definition television channels. If desired, recording device 302 may contain circuitry for handling analog, digital, and high-definition channels. Recording device 302 also contains a processor (e.g., a microcontroller or microprocessor or the like) that is used to execute software applications. Recording device 302 may contain memory such as random-access memory for use when executing applications. Nonvolatile memory may also be used to store a boot-up routine or other instructions. The hard disk and other storage in recording device 302 may be used to support databases (e.g., program guide databases or other interactive television application databases). The hard disk or other storage in recording device 302 may also be used to record video such as television programs or video-on-demand content or other content provided to recording device 302 over input/output 306.

Recording device 302 may have IR communications circuitry or other suitable communications circuitry for communicating with a remote control. Recording device 302 may also have dedicated buttons and a front-panel display. The front-panel display may, for example, be used to display the current channel to which the recording device is tuned.

Recording device 302 may also have communications circuitry such as a cable modem, an ISDN modem, a DSL modem, a telephone modem, or a wireless modem for communications with other equipment. Such communications may involve the Internet or other suitable communications networks or paths.

If desired, recording device 302 may include a satellite receiver or other equipment that has wireless communications circuitry for receiving satellite signals.

Recording device 302 of FIG. 3, recording device 206 of FIG. 2, or recording enabled set-top box 204 of FIG. 2 may record new video while previously recorded video is being played back on television 304 or 208. This allows users to press a pause button during normal television viewing. When the pause button is pressed, the current television program is stored on the hard disk of digital video recorder 302 (or 206/204). When the user presses play, the recorded video may be played back. This arrangement allows the user to seamlessly pause and resume television viewing. Recording devices may also be used to allow a user to watch a previously-recorded program while simultaneously recording a new program.

The set-top box arrangement of FIG. 2 (which may integrate recording functionality into the set-top box) and the personal video recorder with a built-in set-top box arrangement of FIG. 3 are merely illustrative. Other arrangements may be used if desired. For example, user television equipment may be based on a WebTV box, a personal computer television (PC/TV), or any other suitable television equipment arrangement. If desired, the functions of components such as set-top box 204, recording device 302, a WebTV box, or PC/TV or the like may be integrated into a television or personal computer or other suitable device.

Figure 4:
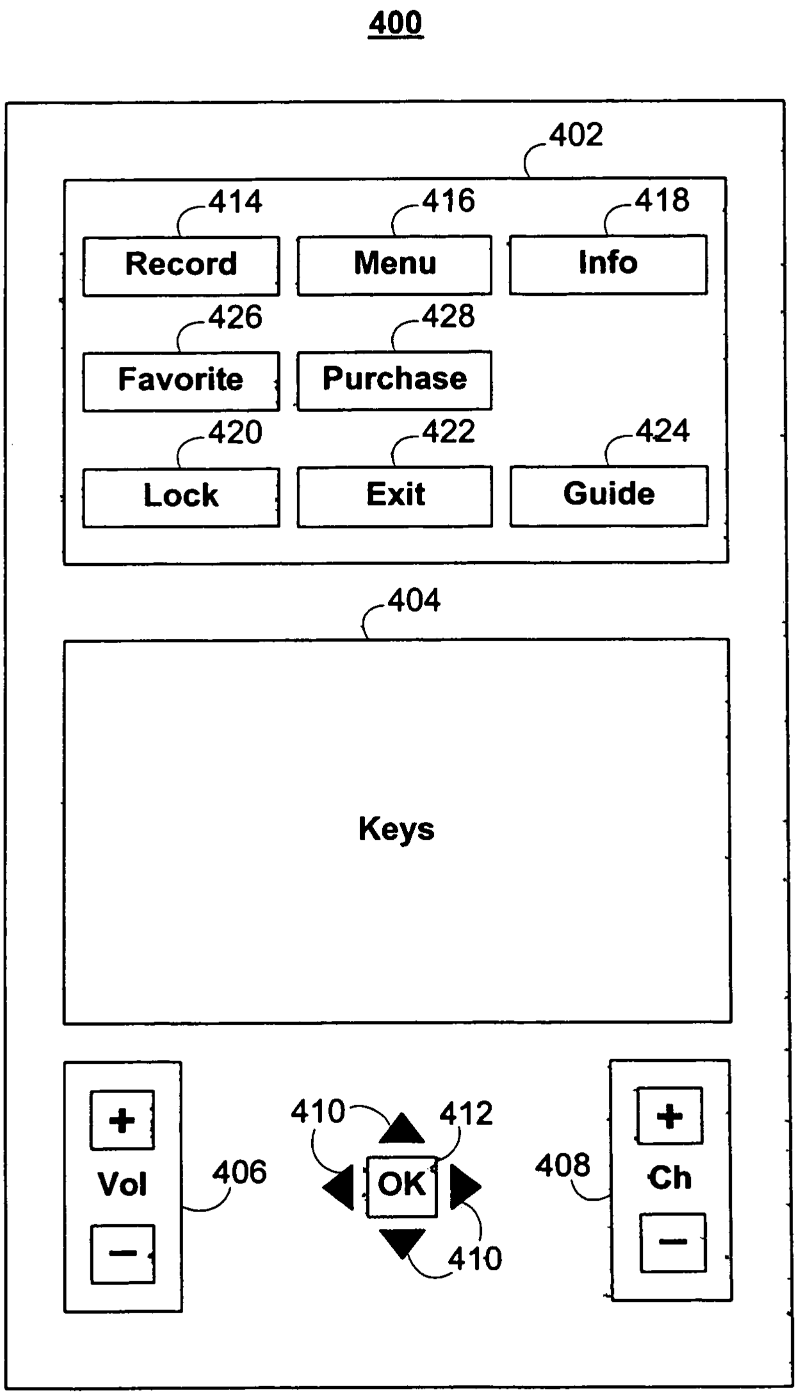
FIG. 4 is a diagram of an illustrative remote control in accordance with the present invention.

An illustrative remote control 400 for operating user television equipment 110 or suitable user computer equipment 112 (FIG. 1) is shown in FIG. 4. Remote control 400 is only illustrative and any other suitable user input interface may be used to operate user equipment (e.g., a mouse, trackball, keypad, keyboard, touch screen, voice recognition system, etc.). Remote control 400 may have function keys 402 and other keys 404 such as keypad keys, power on/off keys, pause, stop, fast-forward and reverse keys. Volume up and down keys 406 may be used for adjusting the volume of the audio portion of a video. Channel up and down keys 408 may be used to change media (television) channels and to access content on virtual channels. Cursor keys 410 may be used to navigate on-screen menus. For example, cursor keys 410 may be used to position an on-screen cursor, indicator, or highlight (sometimes all generically referred to herein as a cursor) to indicate interest in a particular option or other item on a display screen that is displayed by the interactive media guidance application.

OK key 412 (also called a select key) may be used to select on-screen options that the user has highlighted.

Keys 402 may include RECORD key 414 for initiating recordings. MENU button 416 may be used to direct an interactive media guidance application to display a menu on the user's display screen (e.g., on television 208 or 304 or on a suitable monitor or computer display). INFO button 418 may be used to request information from an interactive media guidance application. For example, when a user presses INFO key 418 while accessing programming from a given media channel, the guidance application may display a FLIP/BROWSE overlay including information on the currently accessed programming. As another example, when a particular media listing displayed by the guidance application is highlighted by a cursor, the user pressing INFO button 418 may cause the guidance application to provide additional information associated with the media listing (e.g., a program description, schedule information, etc.).

LOCK button 420 may be used to modify access privileges. For example, a parent may use LOCK button 420 or on-screen options to establish parental control settings for the interactive media guidance application. The parental control settings may be time-based settings (e.g., to prevent a child from watching television during a particular time block, such as from 3:00 PM to 5:00 PM daily). The parental control settings may also be used to, for example, block programming based on rating, program, channel, channel group, or any suitable combination thereof. A locked or blocked program (or other media) is typically not accessible until the interactive media guidance application is provided with a suitable personal identification number (PIN). Once this PIN has been entered, the interactive media guidance application will unlock the user's equipment and allow the locked content to be accessed. In one highlighted embodiment, one or more selected channel groups are locked by user actuation of the LOCK button. Locking a channel group may deny access to all the media channels and media listings belonging to the channel group (pending entry of the PIN).

EXIT button 422 may be used to exit the interactive media guidance application or to exit a portion of the interactive media guidance application (e.g., to cause the guidance application to remove a FLIP, BROWSE, or other interactive overlay from the display screen). GUIDE button 424 may be used to invoke the media guidance application (e.g., a channel group menu screen, a media listings display screen, or other guidance application screen). FAVORITE button 426 may be used to set a media channel or channel group as a favorite (e.g., pressing the FAVORITE button after selecting one or more channel groups sets all the group channels as favorite channels). PURCHASE button 428 may be used to purchase programming or channels that require payment. For example, PURCHASE button 428 may be used to subscribe to all the media channels in one or more selected channel groups.

The keys shown in FIG. 4 are merely illustrative. Other keys or buttons may be provided if desired. For example, a music button may be used to access music with the interactive media guidance application. An edit button may be used to edit stored content (e.g., to remove commercials, remove portions of a video, etc.). Alphanumeric buttons may be used to enter alphanumeric characters. A last or back button may be used to browse backward in the interactive media guidance application (e.g., to return to a previous channel, web page, or other display screen). Video recorder function buttons such as a play button, pause button, stop button, rewind button, fast-forward button, and record button, may be used to control video recorder functions (local or network-based) in system 100 (FIG. 1). A help key may be used to invoke help functions such as context-sensitive on-screen help functions.

Figure 5:
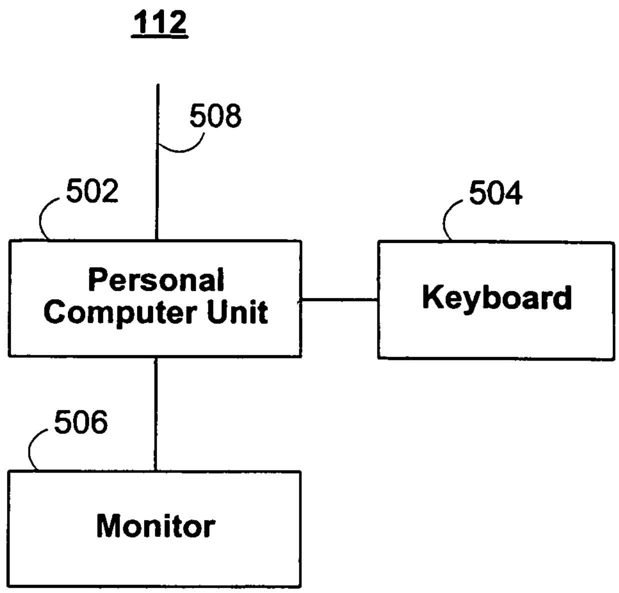
FIG. 5 is a diagram of illustrative user computer equipment in accordance with the present invention.

Illustrative user computer equipment 112 (FIG. 1) is shown in FIG. 5. User computer equipment 112 may be stand-alone or a part of home network 113 (FIG. 1). In the arrangement of FIG. 5, personal computer unit 502 may be controlled by the user using keyboard 504 and/or other suitable user input device such as a trackball, mouse, touch pad, touch screen, voice recognition system, or a remote control, such as remote control 400 of FIG. 4. Video content, such as television programming or web pages having video elements, and interactive media guidance application display screens may be displayed on monitor 506. Television and audio programming, media guidance application data (e.g., television program guide data), video-on-demand content, video recordings played back from a network-based video recorder, and other data may be received from paths 118 and 138 (FIG. 1) using input/output 508. User commands and other information generated as a result of user interactions with the interactive media guidance application and system 100 (FIG. 1) may also be transmitted over input/output 508.

Personal computer unit 502 may contain a television or video card, such as a television tuner card, for decoding analog, digital, and high-definition television channels and for handling streaming video content. Multiple video cards (e.g., tuner cards) may be provided if desired. An illustrative television tuner card that may be used may contain an analog television tuner for tuning to a given analog channel, digital decoding circuitry for filtering out a desired digital television or music channel from a packetized digital data stream, and a high-definition television tuner for tuning to a high-definition channel. Any suitable card or components in computer unit 502 may be used to handle video and other content delivered via input/output line 508 if desired.

Personal computer unit 502 may contain one or more processors (e.g., microprocessors) that are used to run the interactive media guidance application or a portion of the interactive media guidance application.

Personal computer unit 502 may include a hard drive, a recordable DVD drive, a recordable CD drive, or other suitable storage device or devices that stores video, program guide data, and other content. The interactive media guidance application and personal computer unit 502 may use a storage device or devices to, for example, provide the functions of a personal video recorder.

User equipment, such as user equipment 108, user television equipment 110, user computer equipment 112, and user equipment located on home network 113, may be used with network equipment such as server 130, server 140, and equipment at service providers such as service provider 142 (FIG. 1) to provide network-based video recording functions. Video recording functions may be provided by storing copies of television programs and other video content on a remote server (e.g., server 130 or server 140) or other network-based equipment, such as equipment at a service provider such as service provider 142.

Video recordings may be made in response to user commands that are entered at user equipment 108 or user equipment located on home network 113 (FIG. 1). In a personal video recorder arrangement, the interactive media guidance application may be used to record video locally on the user equipment in response to the user commands. In a network-based video recorder arrangement, the interactive media guidance application may be used to record video or to make virtual recordings (described below) on network equipment such as server 130, server 140, or equipment at service provider 142 in response to the user commands. The user commands may be provided to the network equipment over the communications paths shown in FIG. 1. The personal video recorder arrangement and the network-based video recorder arrangement can support functions such as fast-forward, rewind, pause, play, and record.

To avoid unnecessary duplication in a network-based video recorder environment, system 100 may provide network-based video recording capabilities by using virtual copies or recordings. With this approach, each user may be provided with a personal area on the network that contains a list of that user's recordings. The video content need only be stored once (or a relatively small number of times) on the network equipment, even though a large number of users may have that video content listed as one of their recordings in their network-based video recorder personal area. Personal settings or any other suitable data may be stored in a user's personal area on the network.

Figure 6:
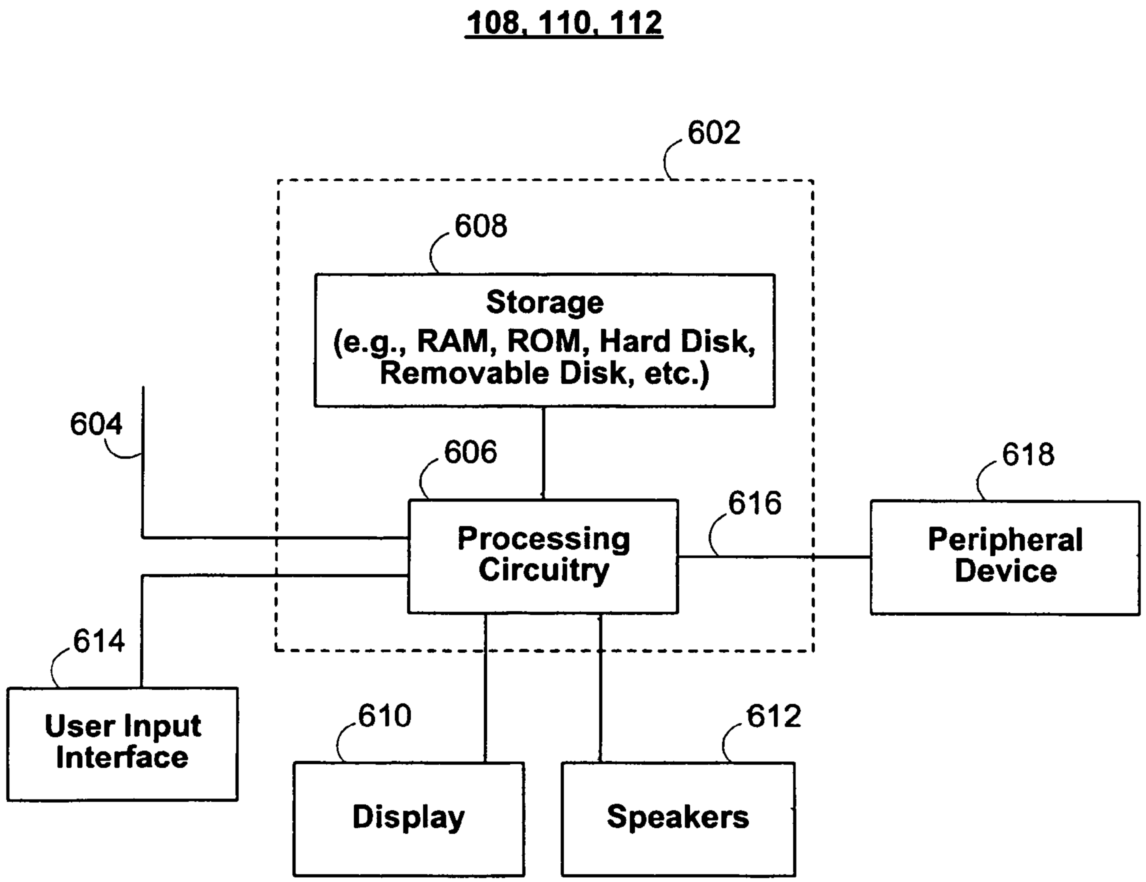
FIG. 6 is a generalized diagram of illustrative user equipment in accordance with the present invention.

The user television equipment and user computer equipment arrangements described above are merely illustrative. A more generalized embodiment of illustrative user equipment 108, 110, and 112 (FIG. 1) and user equipment located on home network 113 (FIG. 1) is shown in FIG. 6. Control circuitry 602 is connected to input/output 604. Input/output 604 may be connected to one or more communications paths such as paths 114, 116, 118, 128, 136, and 138 of FIG. 1. Media (e.g., television programming, music programming, other video and audio, and web pages) may be received via input/output 604 (e.g., from programming sources 102, servers or other equipment, such as server 130, service providers such as service provider 142, distribution facility 104, etc.). Interactive media guidance application data, such as program schedule information for an interactive television program guide, may be received from data source 120 via input/output 604. Input/output 604 may also be used to receive data from data source 120 for other interactive television applications. The user may use control circuitry 602 to send and receive commands, requests, and other suitable data using input/output 604.

Control circuitry 602 may be based on any suitable processing circuitry 606 such as processing circuitry based on one or more microprocessors, microcontrollers, digital signal processors, programmable logic devices, etc. In some embodiments, control circuitry 602 executes instructions for an interactive media guidance application or other interactive application (e.g., web browser) from memory. Memory (e.g., random-access memory and read-only memory), hard drives, optical drives, or any other suitable memory or storage devices may be provided as storage 608 that is part of control circuitry 602. Tuning circuitry such as one or more analog tuners, one or more MPEG-2 decoders or other digital video circuitry, high-definition tuners, or any other suitable tuning or video circuits or combinations of such circuits may also be included as part of circuitry 602. Encoding circuitry (e.g., for converting over-the-air, analog, or digital signals to MPEG signals for storage) may also be provided. The tuning and encoding circuitry may be used by the user equipment to receive and display, play, or record a particular television or music channel or other desired audio and video content (e.g., video-on-demand content or requested network-based or local video recorder playback). Television programming and other video and on-screen options and information may be displayed on display 610. Display 610 may be a monitor, a television, or any other suitable equipment for displaying visual images. In some embodiments, display 610 may be HDTV-capable. Speakers 612 may be provided as part of a television or may be stand-alone units. Digital music and the audio component of videos displayed on display 610 may be played through speakers 612. In some embodiments, the audio may be distributed to a receiver (not shown), which processes and outputs the audio via speakers 612.

A user may control the control circuitry 602 using user input interface 614. User input interface 614 may be any suitable user interface, such as a mouse, trackball, keypad, keyboard, touch screen, touch pad, voice recognition interface, or a remote control.

Peripheral device 618 may also be connected to processing circuitry 606 over communications path 616. Peripheral devices may include cellular phones, personal data assistants, handheld media players, and any other suitable peripheral device. Communications path 616 may include for example, USB cables, IEEE 1394 cables, or wireless paths (e.g., Bluetooth, infrared). Processing circuitry 606 may provide content and data to peripheral device 618.

Figure 7:
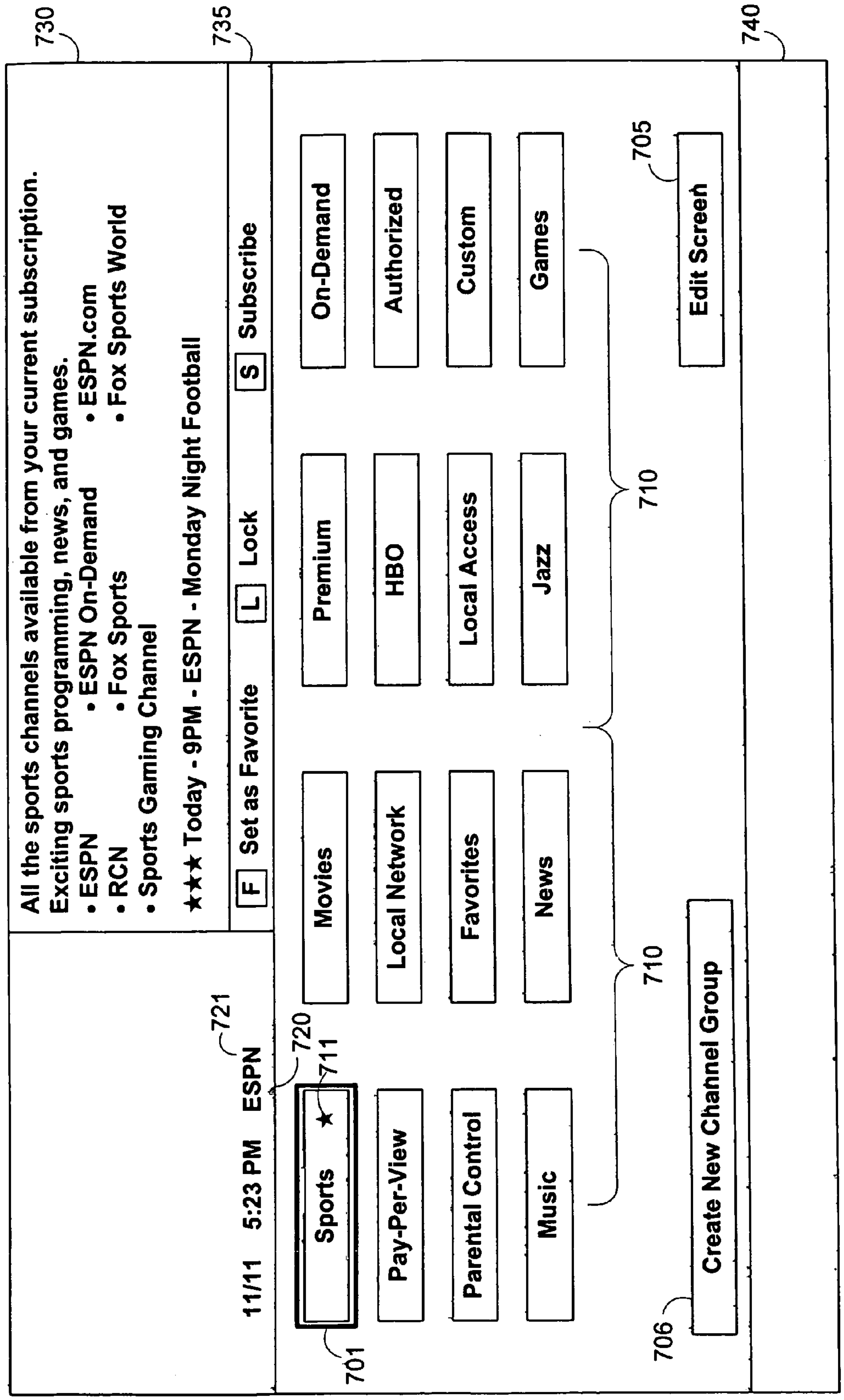
FIG. 7 shows an illustrative channel group selection screen in accordance with the present invention.

FIG. 7 shows an illustrative display screen of the interactive media guidance application. Screen 700 includes interactive elements 710 that represent the channel groups available to the user for selection. The list of channel groups that are included in this channel group selection screen may be all the available channel groups or some subset thereof. When fewer than all the available channel groups are displayed in screen 700, the subset of channel groups to be displayed may be determined by the service provider (e.g., provider 142 of FIG. 1), by the user, or by a combination of inputs from both. In one embodiment, the channel groups to be included in screen 700 may be provided by the service provider using profile information on the user. The user profile information may include information on the media channels and programming accessed by the user. If a user frequently accesses media channels belonging to the sports channel group or frequently accesses sports programming, the guidance application may select the sports channel group for display in channel group selection screen 700. In one approach, user profile information may also be used to determine the rank order in which channel groups are displayed in screen 700. For example, channel groups that are most frequently accessed by the user (or which contain the channels or programming most frequently accessed by the user) may be prominently displayed in the first row of channel groups on screen 700. Such "favorite" channel groups may also be indicated to the user (e.g., by displaying a given element 710 larger than other elements or by adding an indicator 711 to the element).

Figure 8:
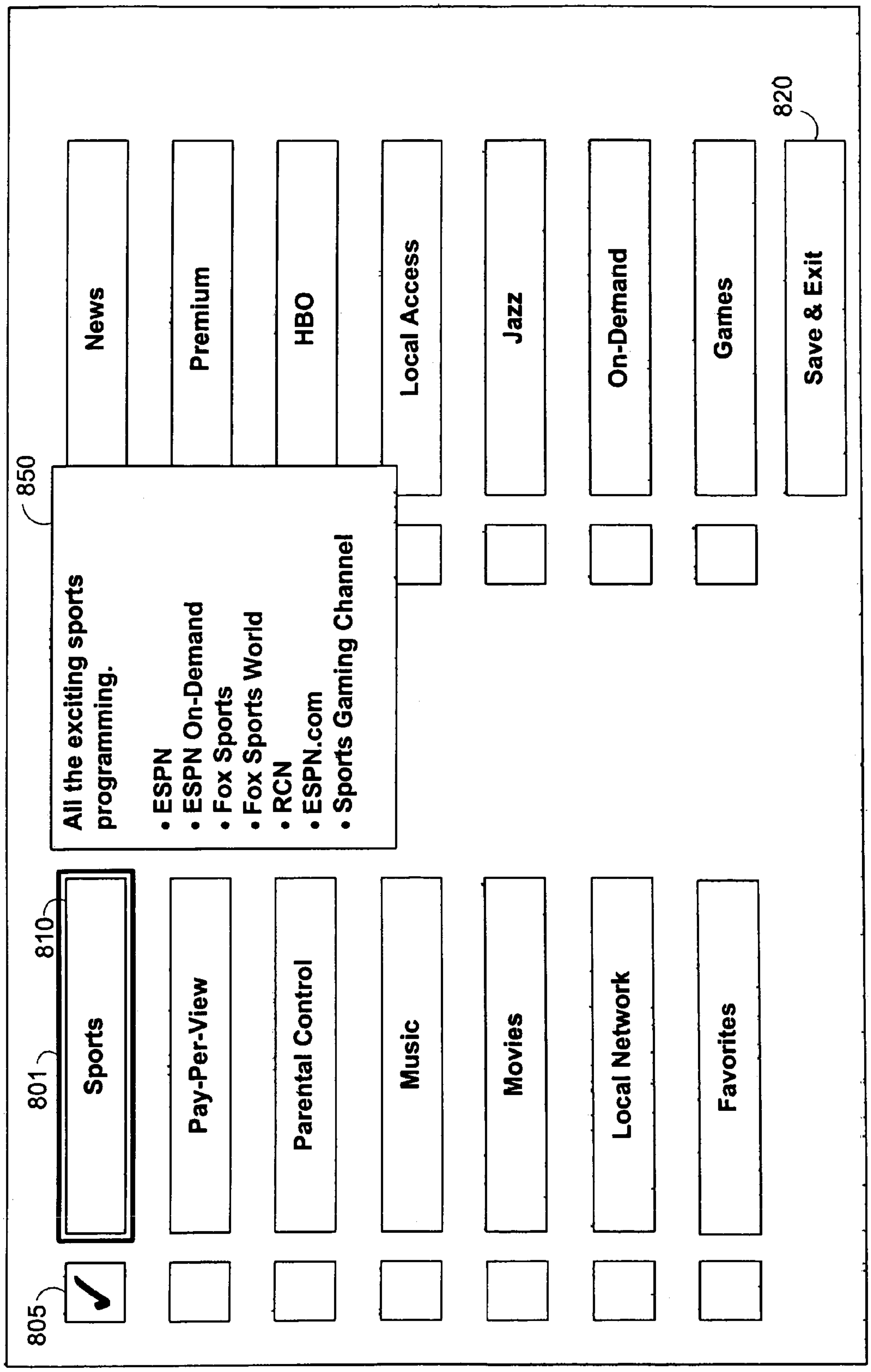
FIG. 8 shows an illustrative channel group edit screen in accordance with the present invention.

Alternatively, the roster of channel groups on screen 700 may be manually set by the user through an edit screen that may be accessed from screen 700 by user selection of button 705. As illustrated by FIG. 8, edit screen 800 may enable the user to select channel groups by placing cursor 801 over check box 805 corresponding to a desired channel group and pressing the select key on the user input device. A selected channel group may be indicated on screen 800 by displaying a checkmark in the corresponding box 805. Interactive elements 810, which indicate the channel group names, may be similarly selected by the user to view information on the selected channel group (e.g., a description of the channel group). For example, information on the sports channel group highlighted by cursor 801 may be displayed in overlay 850 when the user presses the select key 412 on the user input device. As shown, overlay 850 may describe the selected channel group and provide a list of the media channels included in the channel group. At the conclusion of user selection, the user may select button 820 to save the settings and exit back to screen 700.

Returning to FIG. 7, screen 700 may include a reduced-scale video display window 720 (e.g., picture-in-picture or picture-in-guide window) and an information display area 730. A cursor 701 may be displayed in screen 700 and may be used by the user in conjunction with user input device 400 to highlight interactive elements of the display screen. For example, cursor 701 may be used by the user to highlight one of the interactive channel group elements 710. In one embodiment, when cursor 701 is located on a particular channel group element 710, window 720 may display video related to the highlighted channel group. For example, window 720 may display one or more video clips promoting the highlighted channel group itself, the individual media channels within the channel group, or the media programming available through the group channels (e.g., featured programming). In one approach, the user may be required to make an indication that the user wishes to view video related to the highlighted channel group before window 720 begins displaying the video. For example, when cursor 701 is located on a channel group element 710, the user may be required to press INFO key 418 on the user input device to start viewing the one or more video clips.

In another embodiment, the user may also be able to view live media programming from the group channels through window 720. For example, when the user places cursor 701 on a channel group element (and optionally, presses the INFO key), window 720 may provide live video of a first media channel belonging to the highlighted channel group. Audio of the media channel displayed in window 720 may or may not be provided, in some instances, depending on whether the media channel is a television channel or an audio-centric channel, such as a music channel. Window 720 may provide an identification of the first media channel in its video display. For example, when the live video displayed in window 720 is of the media channel ESPN, an overlay 721 may be used in window 720 to identify the media channel. In one approach, when the user presses the INFO key on the user input device while cursor 701 remains on the same channel group element, window 720 may change to display live programming from a second media channel belonging to the highlighted channel group. In this way, the user may cycle through all the channels of a highlighted channel group by repeatedly pressing the INFO key while cursor 701 is on the channel group element. Alternatively, the guidance application may automatically cycle the programming feed in window 720 through the media channels of the channel group. When one of the media channels in a channel group is not a broadcast channel that provides a continuous programming feed (e.g., audio or video feed), window 720 may display a promotional video clip related to that media channel when the user or the guidance application cycles to that channel. For example, an on-demand media channel may be represented in window 720 with a video clip promoting a program available through the on-demand channel, or with a video preview of one of the programs. Alternatively, the guidance application may simply skip media channels without a traditional broadcast type feed as it cycles through the group channels in window 720.

In one embodiment that incorporates both promotional videos related to the channel group and live video of the group channels, window 720 may automatically begin display of promotional video clips related to the highlighted channel group when cursor 701 is placed on a channel group element and, when the user presses the INFO key on the user input device, window 720 may replace the promotional video clips with the programming feed from a first group channel. Further actuations of the INFO key may result in the cycling of the programming feeds from the group channels, as previously described.

Alternatively, window 720 may be used to display general promotional information regarding the channel groups displayed on screen 700 regardless of which channel group element is highlighted by cursor 701.

It should be understood that window 720 may be utilized in any of the above described approaches or in any combination of such approaches. One or more additional video display windows may also be provided on screen 700 and may provide additional promotional opportunities related to channel groups, media channels, media programming, or unrelated products and services.

Information display area 730 may be synchronized with the video being displayed in window 720. For example, when window 720 is displaying a video clip promoting a particular channel group, window 720 may display information on the same channel group. The information provided by area 730 may be text, graphics, video (and any accompanying audio) and may provide a description of the channel group (e.g., the common characteristic or organizing concept for the channel group), the channel group roster, current programming available through the channel group (e.g., featured programming), etc. Similarly, when window 720 is displaying a video clip promoting a particular channel or the live video feed from a particular channel, display area 730 may provide information on the given channel, such as a description of the channel (e.g., the type of programming on which the channel focuses) and promotional information for the channel and its programming. Similarly, when window 720 is displaying a particular program or a promotional video relating to a particular program, display area 730 may provide further information describing and promoting the given program.

Alternatively, information display area 730 may not be synchronized with the video of window 720. In one embodiment, area 730 may be used to generally provide promotional information on channel groups, media channels, and media programming available through the service provider. Such promotional information may periodically and automatically change, such that multiple channel groups, media channels, and media programs may be promoted within a given period of time. Display area 730 may be interactive and may enable the user to initiate one or more guidance application functions with respect to the channel group, channel, or programming being promoted in area 730. For example, when area 730 is displaying information on a particular channel or currently broadcast programming, user selection of area 730 (e.g., by highlighting with cursor 701 and selecting with key 412) may enable the user to access the particular channel or the channel on which the currently broadcast programming is being broadcast. When area 730 is displaying information on future programming, user selection of area 730 may enable the user to set a reminder or a recording for the future programming. It should be understood that such functionality may require the display of further selection menus after user selection of area 730. Such further selection menus may be displayed by the guidance application generally in area 730 or as independent overlays on screen 700.

In another embodiment, information display area 730 may be synchronized with the channel group element highlighted by cursor 701. For example, as shown in FIG. 7, when cursor 701 is highlighting the sports channel group, area 730 may provide information on that channel group (e.g., the common characteristic or organizing concept for the channel group, the channel group roster, featured programming available through the channel group).

It should be understood that display area 730 may be utilized in any of the above described approaches or in any combination of such approaches. One or more additional promotional areas (e.g., area 740) may also be provided on screen 700 and may provide additional promotional opportunities related to channel groups, media channels, media programming, or unrelated products and services.

In another aspect of the present invention, guide application functions may be executed on a channel group. Common functions provided with a guidance application include, for example, setting a channel as a favorite channel, locking programs or channels using a parental control password, and purchasing programs or channels that require a payment. In this aspect of the present invention, the guidance application enables the user to initiate a guidance application function on one or more selected channel groups, instead of a single channel or program. In response to the user command to initiate the function, the guidance application may execute the function on the channel group roster (i.e., all the group channels and all other media listings available through the channel group).

As previously described in connection with FIG. 7, information display area 730 may be used to provide access to guide functions (e.g., for programming being promoted in the area). Area 730 may be similarly used to provide access to functions that are applied upon channel groups. In one embodiment, regardless of what other information is being displayed in area 730, upon user placement of cursor 701 on a channel group element 710, information area 730 may display a list of available guide functions 735 for the highlighted channel group. As illustrated in FIG. 7, exemplary functions 735 include functions to "Set as Favorite," "Lock," and "Subscribe." When the user presses corresponding FAVORITE key 426 on the user input device while the cursor is placed on a channel group element 710, the guidance application will execute the "Set as Favorite" function on the highlighted channel group. Executing the "Set as Favorite" function may cause the guidance application to set all the group channels as favorite channels. Additionally, channel groups that have been set by the user as a "favorite" channel group may be indicated using marker 711.

Similarly, when the user presses the PURCHASE key 428 while the cursor is placed on a channel group element, the guidance application will execute the "Subscribe" function on the highlighted channel group, which may result the guidance application charging the user for a subscription to the group channels and authorizing user access to such channels. It should be noted that the function may be executed on a subset of the group channels. For example, when the user has already subscribed to some of the group channels but not others, executing a "Subscribe" function on the channel group may result in the guidance application processing a subscription for only the previously unsubscribed channels. It should be understood that this concept applies to other guidance application functions as well.

If the user presses the corresponding LOCK key 420 while the cursor is on a channel group element, the guidance application may execute the "Lock" function on the highlighted channel group. Executing the "Lock" function may cause the guidance application to prevent access to the group channels until the entry of a parental control pass code. Additionally, the "Lock" function may also result in the locking of individual media listings made available through the channel group (and therefore on the channel group roster) that may not be sourced from a group channel. For example, when a channel group provides access to an interactive gaming application sourced from a gaming channel that is not a group channel, access to the interactive gaming application may also be locked upon execution of the "Lock" function on the channel group. It should be understood that this concept applies to other guidance application functions as well, such that all media listings provided through the channel group may be affected by an executed function, even when some media listings may not be provided or sourced from a group channel.

In another embodiment, multiple channel groups may be selected by the user for the execution of a guidance application function. For example, with reference to FIG. 7, the user may highlight a first channel group element 710 using cursor 701 and press the INFO key on user input device 400. Actuation of the INFO key selects the channel group element and causes the display of available functions in list 735. When the user moves cursor 701 to a second channel group element and presses the INFO key, the second channel group element is also selected. List 735 may then display a list of functions commonly available for both the first and second selected channel groups. User activation of the corresponding key (e.g., FAVORITE, LOCK, PURCHASE) on user input device 400 may then execute the corresponding function on both the selected channel group rosters (i.e., group channels and other media listings available through the channel group). It should be noted that there may not exist a commonly available function between two or more selected channel groups (e.g., when a first selected channel group is of a different nature than a subsequently selected channel group). In this event, list 735 may remain blank or may display a message indicating that no function is commonly available.

It should be understood that the functions applicable to channel groups may be any appropriate feature or function of the guidance application and is not limited to those illustrated in the foregoing.

Figure 9:
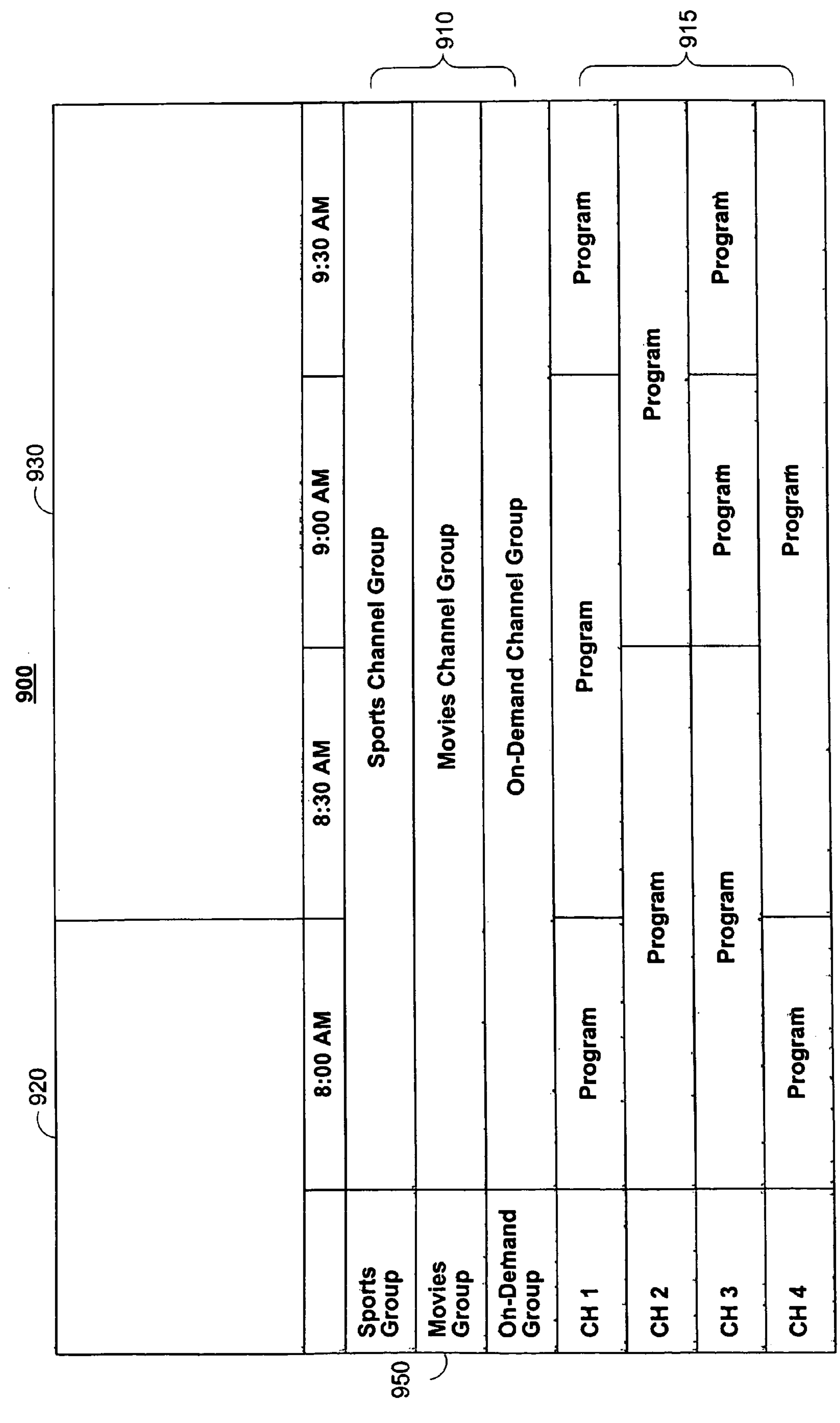
FIG. 9 is a diagram of an illustrative channel group selection screen in accordance with the present invention.

FIG. 9 illustrates a display screen of the guidance application that illustrates an alternative embodiment to the channel group selection screen of FIG. 7. Screen 900 illustrates a display in which channel groups are displayed in the program listings area together with media channels. For example, interactive channel group elements 910 may appear at the top of the program listings grid 950. Channel group elements 910 may also appear together in another area of grid 950 (e.g., at the bottom), or may be interspersed among the media channel listings 915 in the grid (e.g., a sports channel group may be displayed next to a sports media channel). Reduced scale video display window 920 and information display area 930 may operate as they normally do in the program listings screen of the guidance application (e.g., window 920 may provide video for a last tuned channel and area 930 may provide information corresponding to a highlighted listing), or may follow the functionality previously set forth with respect to window 720 and area 730.

Figure 10:
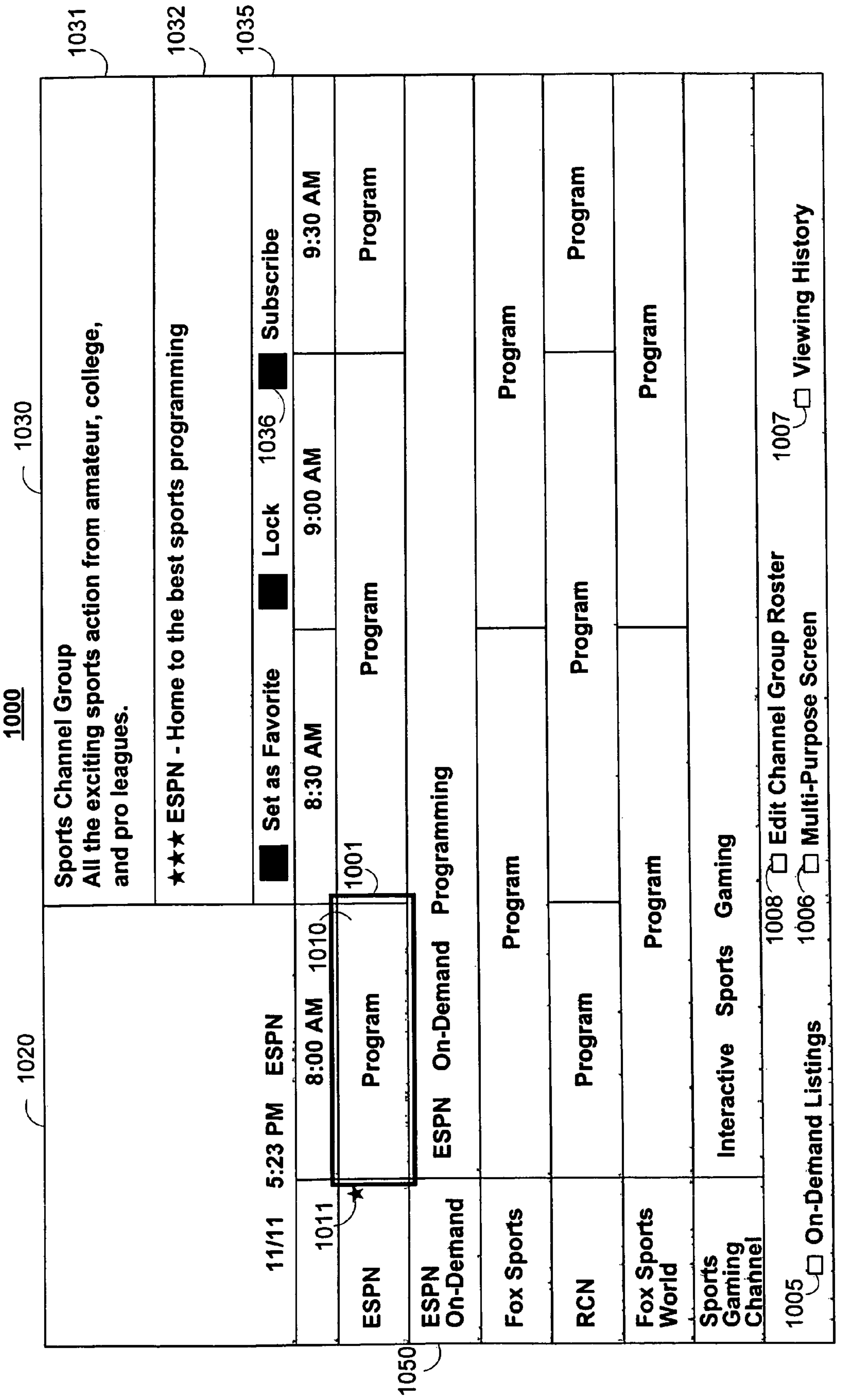
FIG. 10 shows an illustrative channel group portal screen in accordance with the present invention.

In one embodiment of the present invention, when the user selects a channel group (e.g., by placing a cursor on channel group element 710/910 and pressing select key 412 on the user input device), the guidance application may display to the user a channel group portal screen for the selected channel group. As illustrated in FIG. 10, screen 1000 serves as a portal or home screen for the group of channels making up the channel group.

Screen 1000 may serve to provide focused information on the channel group to the user. For example, information display area 1030 may identify the channel group and display information on the channel group itself (e.g., list of group channels, information on the common characteristic or organizing concept for the channel group). As shown in FIG. 10, exemplary screen 1000 is the portal screen for a sports channel group. Consequently, area 1030 may inform the viewer that the channel group is dedicated to sports programming (e.g., as part of a promotional message to entice the viewer). Information area 1030 may also provide promotional information highlighting group channels and programming available through the channel group. In one embodiment, area 1030 may display information on the channel group (1031) as well as scrolling information on group channels and programming (1032). If desired, area 1032 may present information on newly available programming on any of the group channels and other newly available media that is part of the group. Promotional information may also be displayed in one or more additional promotional areas (not shown) of screen 1000. Reduced scale video display window 1020 may cooperate with display area 1030 to provide video information related to the channel group. In one example, window 1020 may display one or more video clips promoting the channel group, its constituent channels, or featured programming available through the channel group. Window 1020 may be synchronized with promotional information 1032 displayed in area 1030 or in one of the additional promotional areas (not shown). In one example, when promotional information 1032 is for a future broadcast program, video window 1020 may display a video clip promoting the future program. When promotional information 1032 is for a currently broadcast program or for a media channel, window 1020 may provide a live video feed of the program. When promotional information 1032 is for an on-demand program, window 1020 may provide a preview clip of the on-demand program. Promotional information, whether displayed in area 1030 or in additional promotional areas, may automatically change to promote a plurality of programs and channels.

Information display area 1030 may also provide access to functions of the guidance application. For example, as previously described with respect to area 730, the user may select area 1030 (e.g., by placing cursor 1001 on the area and pressing the select key on the user input device) to initiate one or more functions of the guidance application on the media channel or programming being promoted (e.g., access the channel or programming, set a reminder for the programming, set a recording for the programming). Additionally, information display area 1030 may provide access to functions that may be executed on the channel group. As previously described with respect to area 730, area 1030 may provide a list 1035 of the guidance application functions available for the current channel group. In one embodiment, interactive items 1036 may be provided in list 1035 that enable the user to highlight and select a function to be executed on the present channel group.

As shown in FIG. 10, media listings for programming available through the channel group are displayed in grid 1050. Screen 1000 illustrates a time and channel grid type of listings display, but it should be understood that the display of listings may be of any suitable format. Additional guide functionalities, such as sort and search functions, may also be provided to the user through screen 1000 and may be focused on the media listings of the channel group. In guidance applications that enable a list of favorite channels, favorite channels that are part of the channel group may be displayed at the top of grid 1050 and may be indicated by a marker 1011 in the channel identification area. Alternatively, favorite channels may be interspersed in the grid and indicated by marker 1011. Interactive elements 1010 in grid 1050 represent the media programming available through the group channels. For broadcast channels, elements 1010 occupy a length corresponding to a program duration. For non-broadcast channels, such as on-demand channels, a single element 1010 may span the entire length of grid 1010. Element 1010 may include any suitable information related to the associated program, such as its title, rating, description, indicators of upcoming actions (such as scheduled recordings), flags to indicate newly available content, and other related text and indicators. User selection of element 1010 (e.g., by placing cursor 1001 on the element and pressing the select key on the user input device) may initiate access to the selected programming, available guide functions for the selected programming (e.g., set reminder, set recording, view detailed information), or both.

In some systems, on-demand programming that originates from a particular media channel or a particular programmer is grouped together in an on-demand channel. For example, on-demand programming that originates from the media programmer ESPN may be accessed by the user from the ESPN ON-DEMAND channel. User selection of this on-demand channel may provide the user with access to an interactive media guidance application (e.g., a series of interactive displays) for receiving information on and accessing individual on-demand programs. In one approach illustrated by FIG. 10, on-demand media channels are provided in the listings grid as a channel. User selection of element 1010 corresponding to an on-demand channel initiates user access to the guidance application provided by the on-demand channel. Similarly, other non-broadcast media channels (e.g., games channels, web page channels, etc.) may also be listed in the grid in this manner.

Figure 11:
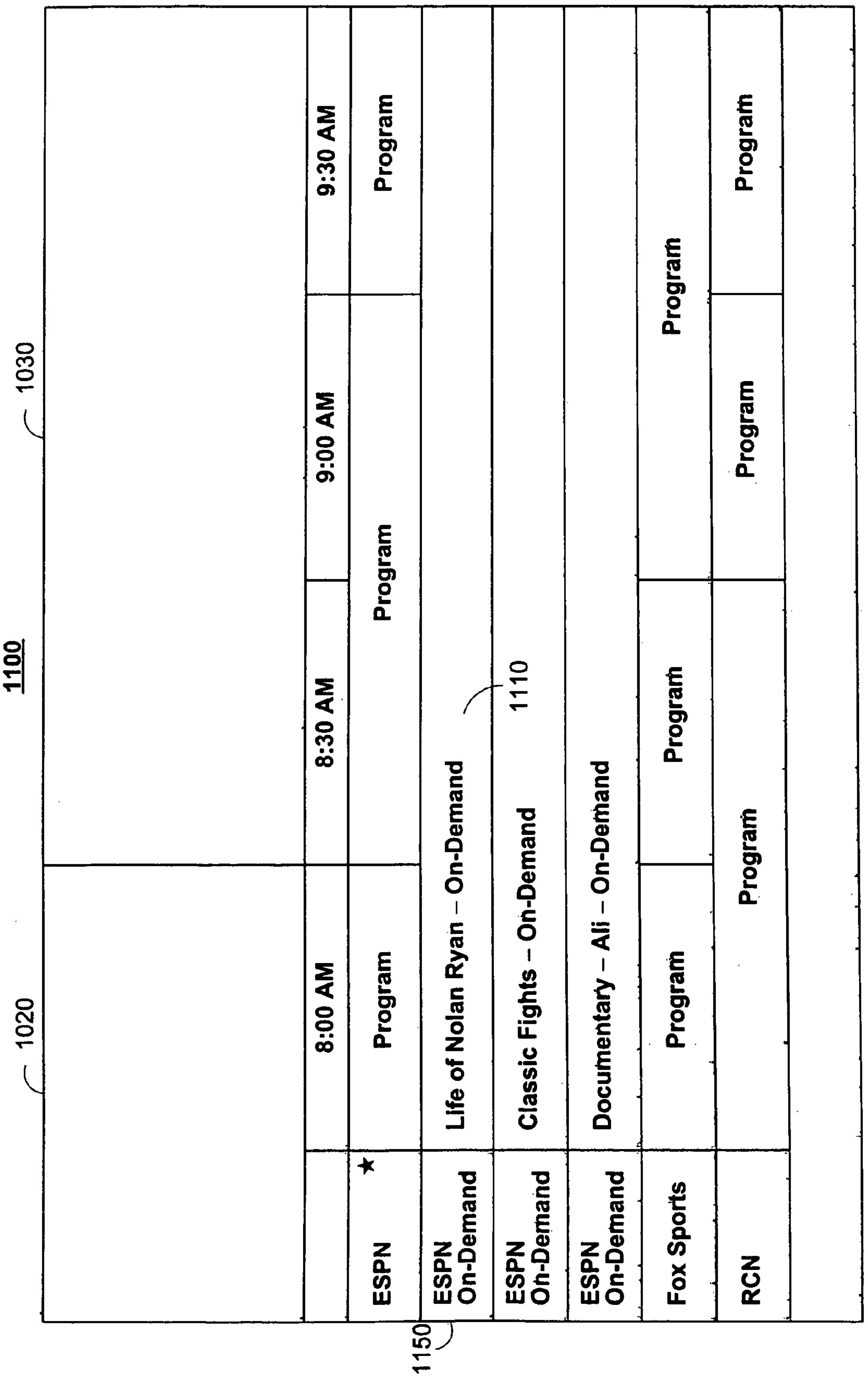
FIG. 11 shows an illustrative channel group portal screen in accordance with the present invention.

In another approach, listings for on-demand programming from the on-demand group channels may appear individually in the listings grid. As illustrated by FIG. 11, elements 1110 corresponding to individual on-demand programs may appear to take the place of an individual media channel and may span the entire length of the grid. The on-demand media listings may be grouped together at the top or bottom of the listings grid 1150 or may be located immediately underneath the media channel from which the on-demand programming originates or with which the on-demand programming shares a common programmer. For example, as shown in FIG. 11, on-demand programming from the ESPN On-Demand channel may appear directly underneath the ESPN media channel in the grid. User selection of an on-demand listing 1110 may enable the user to receive information on the program and request to access the program. A similar approach may be taken with non-traditional media such as interactive gaming applications and Internet web pages. For example, an individual gaming application or an individual web page (e.g., containing a single story from a news web site) may be listed in this manner instead of through a gaming channel or web site channel. It should be noted that the on-demand media listings provided in grid 1150 need not be sourced from an on-demand channel that belongs to the channel group. Individual on-demand media listings may be added to the channel group roster by the user or by the service provider, and may meet the common characteristic for the channel group as an individual media listing and not as a media channel.

In another approach, all the on-demand media listings available through the channel group may be organized under a single on-demand channel for the channel group. For example, all on-demand media listings available through the sports channel group may be accessed through user selection of a sports group on-demand channel that may be organized solely for use in the channel group portal screen.

In some embodiments, listings grid 1050 may include only a subset of the non-broadcast content that is available as part of the channel group. For example, the grid may feature popular on-demand content, newly released on-demand content, or on-demand content that is currently being promoted by the service provider. In these embodiments, the full list of available non-broadcast content may be available through separate screens.

Figure 12:
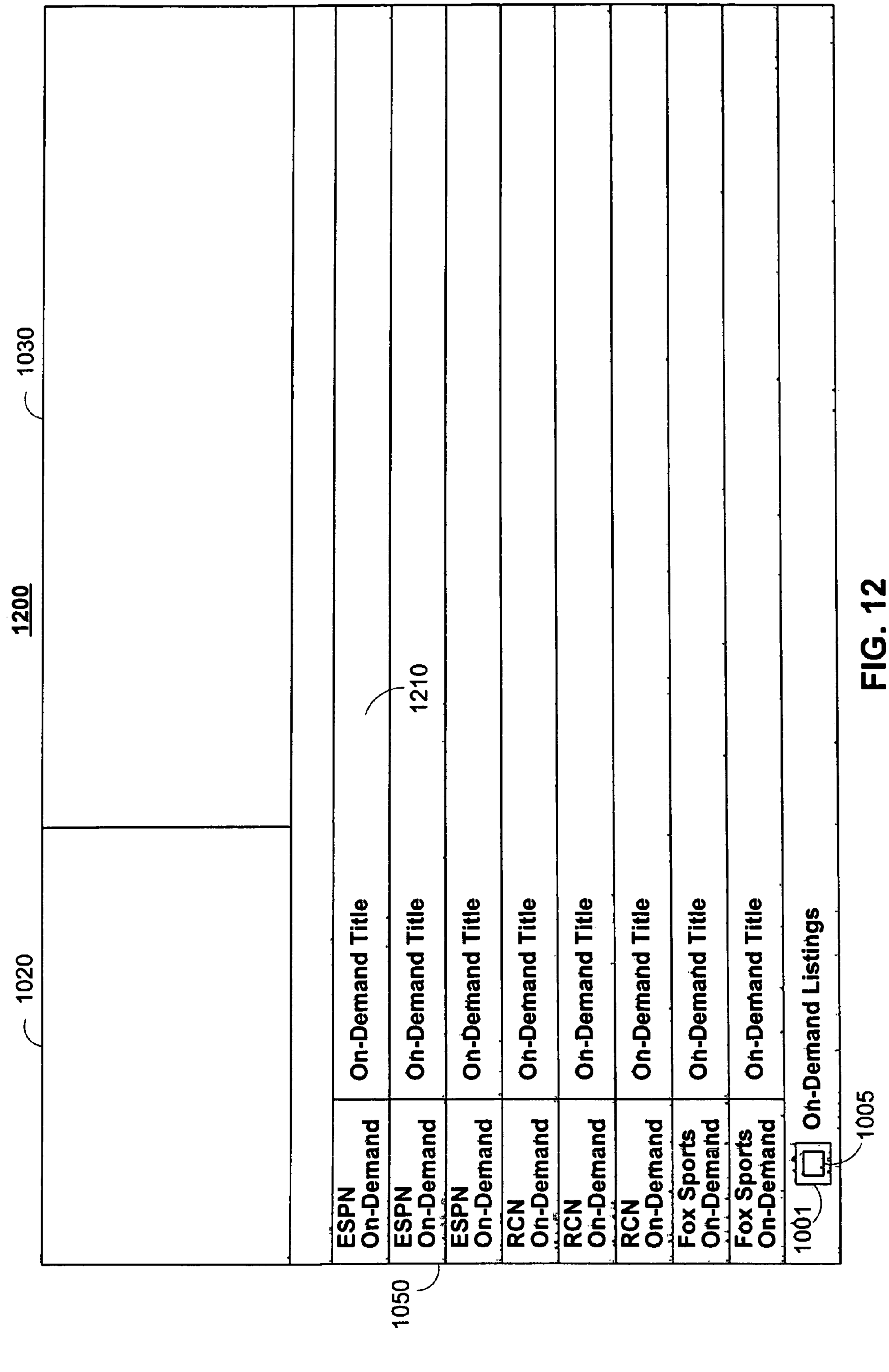
FIG. 12 shows an illustrative channel group on-demand media listings screen in accordance with the present invention.

In some embodiments, on-demand programming available through the channel group may be accessed through a separate menu of the guidance application. As illustrated by FIG. 10, the guidance application may provide interactive item 1005 that provides access to a dedicated on-demand media listing menu upon user selection. As illustrated by FIG. 12, upon user selection of item 1005, the guidance application may replace the listings previously displayed in the listings area 1050 with all the on-demand media listings 1210 available through the channel group. The on-demand listings may be sorted in any suitable order. For example, they may be alphabetical, ordered to highlight newly available content, ordered on a promotional basis, ordered by popularity, or ordered on any other suitable basis. It should be understood that the on-demand listings displayed may be accomplished in a variety of alternative approaches and may additionally enable the user to search and sort the on-demand media listings. A similar effect may be achieved through screen 1000 in the embodiment where a single on-demand channel is provided for all the on-demand programming available through the channel group.

As previously discussed in relation to FIG. 7, reduced scale video display windows of the present invention may be used to display the live video feed of a group channel and other video related to the channel group. Turning to the channel group portal screens of FIGS. 10, 11, and 12, similar functionality may be assigned to window 1020. In one embodiment, when the user moves cursor 1001 to highlight a program listing in the listings grid, window 1020 may display the live video feed of the media channel corresponding to the highlighted listing, or a promotional video clip for the given channel. When the highlighted listing is for an on-demand program (see FIGS. 11 and 12), the video window may display the on-demand program, a promotional video clip for the on-demand program, or a promotional video clip for the on-demand channel associated with the program. In another embodiment, the user may place the cursor onto video display window 1020 and (optionally, upon pressing INFO key 418) receive the live video for a first media channel. As previously described in connection with window 720, video windows 1020 may cycle through the live video feed for each of the group channels upon further user actuation of the INFO key. Alternatively, the guidance application may automatically cycle through the live video feeds without user input, or may provide means for the user to a given group channel for which to receive the live video feed.

Figure 12A:
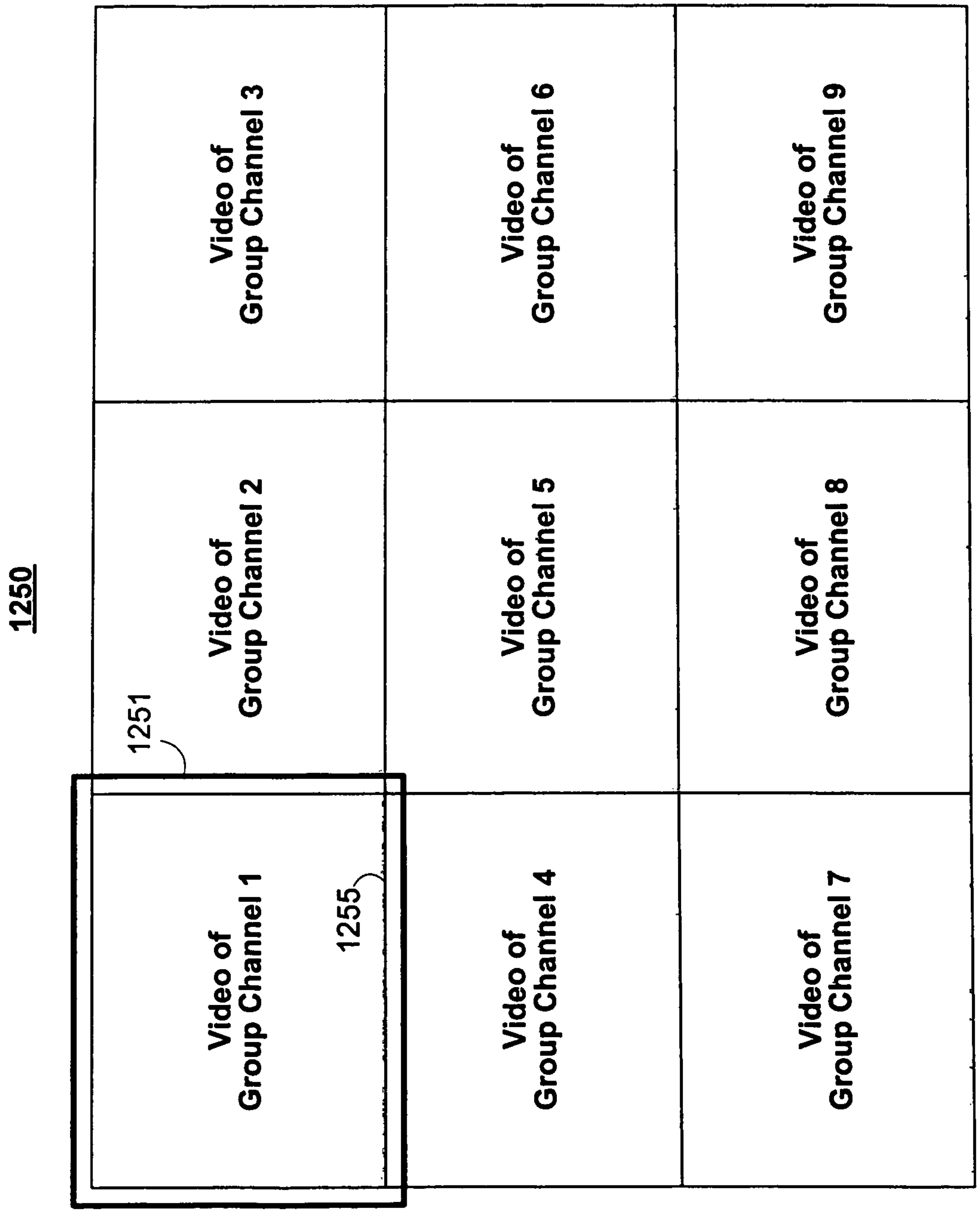
FIG. 12A shows an illustrative channel group video mosaic screen in accordance with the present invention.

In one embodiment, live video feeds from the group channels may be presented to the user in a video mosaic format. For example, as illustrated by FIG. 12A, reduced scale video windows 1255 may be used to simultaneously display the live video feed from each of the group channels. Display screen 1250 may, for example, be accessed from channel group portal screen 1000. In one suitable approach, the user may move cursor 1001 onto video display window 1020 and indicate a desire to view the mosaic screen 1250 by pressing the select key on the user input device. As shown in FIG. 12A, cursor 1251 may be provided on screen 1250, the cursor being movable between the windows 1255 to highlight a given window. In the event that all the group channel video feeds do not fit onto a single display screen, the guidance application may provide additional screens to accommodate the additional video windows or may enable the user to scroll to additional video windows using cursor 1251. In one embodiment, the guidance application may enable tuning operation from screen 1250. For example, the user may move cursor 1251 onto a window 1255 and press the select key on the user input device. Upon such user input, the guidance application may tune the user to the group channel represented by selected window 1255. In one embodiment, individual media listings, such as on-demand listings, may also be represented by a video window 1255. For example, in the case of an on-demand media listing, the guidance application may provide a preview of the media program or a promotional video for the media program. In one embodiment, any audio programming provided through the media channels or media listings represented in windows 1255 may be provided to the user when cursor 1251 is placed on a given window. In some embodiments, text is displayed in conjunction with each video window, to describe or promote the channel or its content. In some embodiments, the user may press an info key on the remote while a video window is highlighted to access additional information about the media or to perform other action related to the media.

Figure 13:
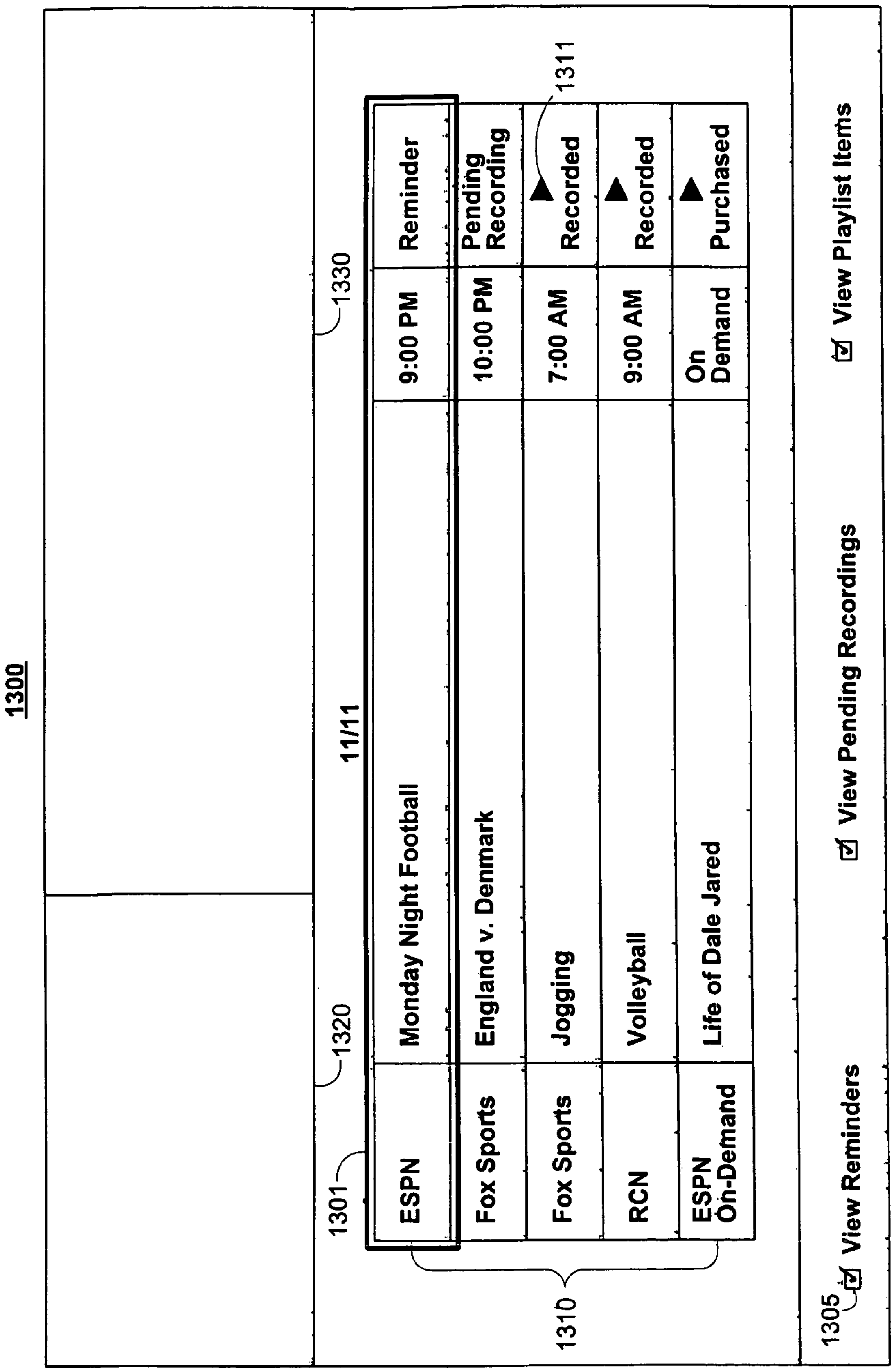
FIG. 13 shows an illustrative channel group multi-purpose screen in accordance with the present invention.

FIG. 13 shows a multipurpose screen of the guidance application that enables the user to see all programming reminders, pending recordings, completed recordings, and purchased programming from the channel group. Optionally, previously accessed on-demand media programming may also be included when the programming remains available for access by the user. Screen 1300 may be accessed by user selection of item 1006 from screen 1000. In one approach illustrated by screen 1300, this multipurpose screen may be organized by date. For example, as shown in FIG. 13, all reminders, recordings, and purchases from a particular day are placed together under the display heading for that day. Therefore, with reference to screen 1300, the user is informed that on November 11th, a programming reminder for "Monday Night Football" on media channel ESPN has been set for the start time of 9 pm. The user is informed that on the same day, a recording has been set for the "England vs. Denmark" soccer match on FOXSPORTS at 10 pm. The user is also informed that on November 11th, a jogging program that began at 7 am was recorded from the FOXSPORTS channel and that a volleyball match was recorded from the RCN channel beginning at 9 am. In addition, the user is informed that on November 11th, a pay-per-view on-demand program, "Life of Dale Jared," was purchased from ESPN ON-DEMAND. Because multipurpose screen 1300 may include both future programming items (e.g., future programming reminders and pending recordings) and past items (e.g., recorded or purchased programming, expired programming reminders), screen 1300 may be available for a set period both in the past and future (e.g., for the ten day period before and after the present date). If desired, past programming may be shown for each day it continues to be available. For example, a recorded program may be shown for each day beginning when it is recorded and ending when the recording is deleted. As another example, a purchased on-demand program may be shown for each day beginning when it is purchased and ending when the program is no longer authorized for viewing.

Elements 1310, which represent the reminders, recordings, purchases (and, optionally, previously accessed and still authorized on-demand programs) in screen 1300, may be interactive. A cursor 1301 may be provided that enables the user to highlight an element 1310. For example, the user may highlight an element 1310 that represents a programming reminder. Upon user selection of that element (e.g., by pressing the select key of the user input device), the user may be able to edit or delete the programming reminder as well as view detailed information about the program with the scheduled reminder and perform other functions related to the program. Similarly, the user may be able to interact with a pending recording element to edit or delete the scheduled recording, view program information, and perform other program-related functions. User selection of elements 1310 that represent recorded programming or purchased programming may enable the user to access the recorded or purchased programming (if the programming is still accessible).

Reduced scale video display window 1320 may be used to display a video corresponding to the programming element 1310 highlighted by cursor 1301. For example, when a future program is highlighted using cursor 1301 (e.g., programming a reminder or a pending recording), window 1320 may display a promotional video clip about the upcoming program or a preview of the upcoming program. In another example, when cursor 1301 highlights an element 1310 that represents currently accessible programming (e.g., recorded or purchased programming, on-demand programming that remains available for access), window 1320 may begin playback of the programming or provide a clip of the programming. As previously described in connection with other embodiments, window 1320 may begin the display of video related to a highlighted program only upon some user indication to do so (e.g., pressing INFO request key on the user input device while cursor 1301 highlights the program element). Description area 1330 may cooperate with window 1320 to provide further information on the highlighted program.

In one approach, the user may be able to edit the content of multipurpose screen 1300 using selectable items 1305. By selecting items 1305, the user may control whether programming reminders are included on the screen, whether pending recordings are included on the screen, and whether play list items (i.e., programs that are available for access, such as recorded programming, purchased or previously accessed programming that remain accessible) are included on the screen. A play list for the channel group may be generated by the guidance application by merging a list of recorded programs from the channel group and a list of the previously purchased or accessed programs from the channel group that remain accessible to the user. Items 1310 that are accessible to the user (e.g., recorded programs and some purchased programs) may be accessed by user selection of the element (e.g., by placing cursor 1301 on the element and pressing the select key). In addition, accessible items 1310 may include an additional marker 1311 indicating to the user that the programming is available for playback.

Figure 14:
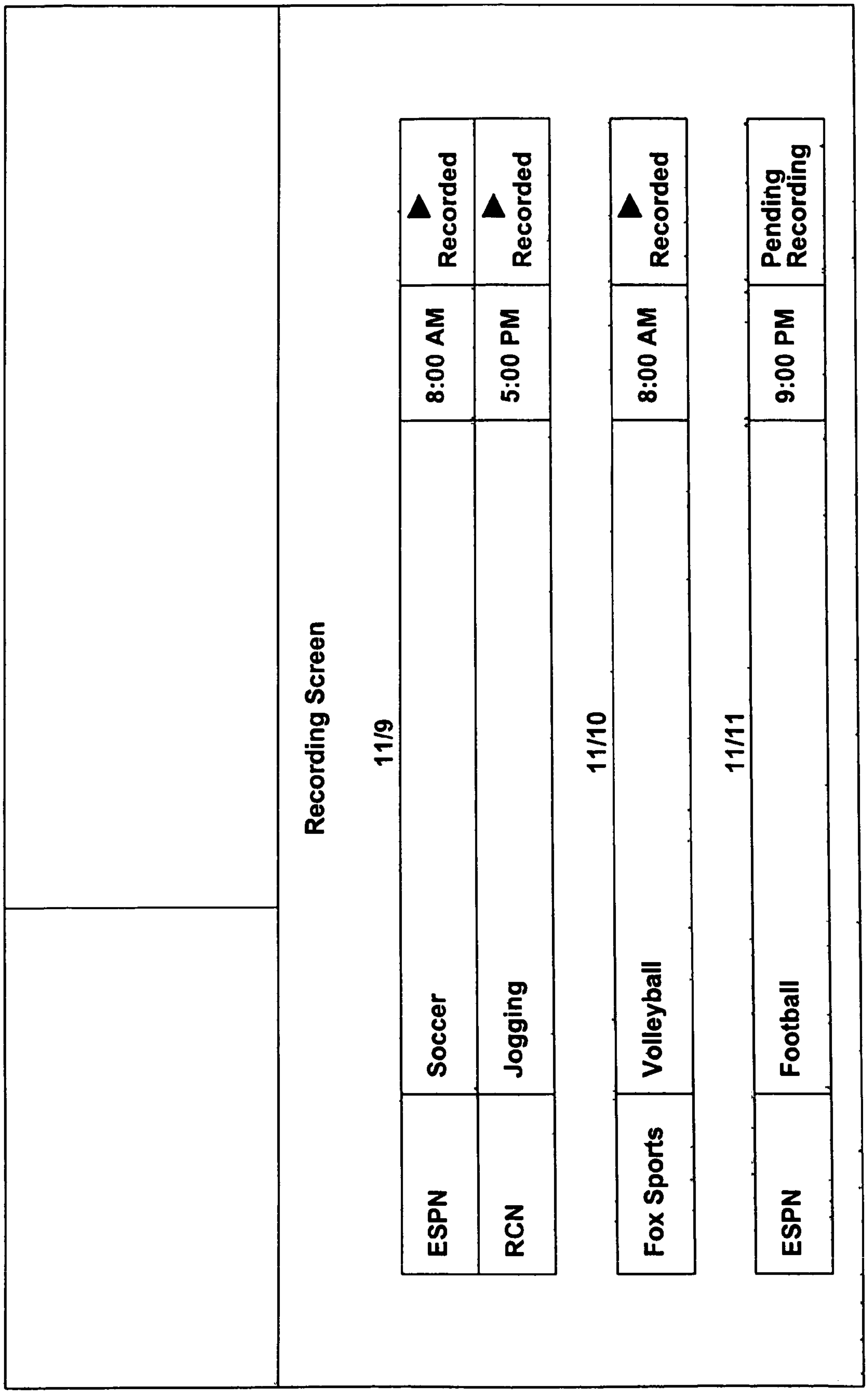
FIG. 14 shows an illustrative channel group recording screen in accordance with the present invention.
Figure 14A:
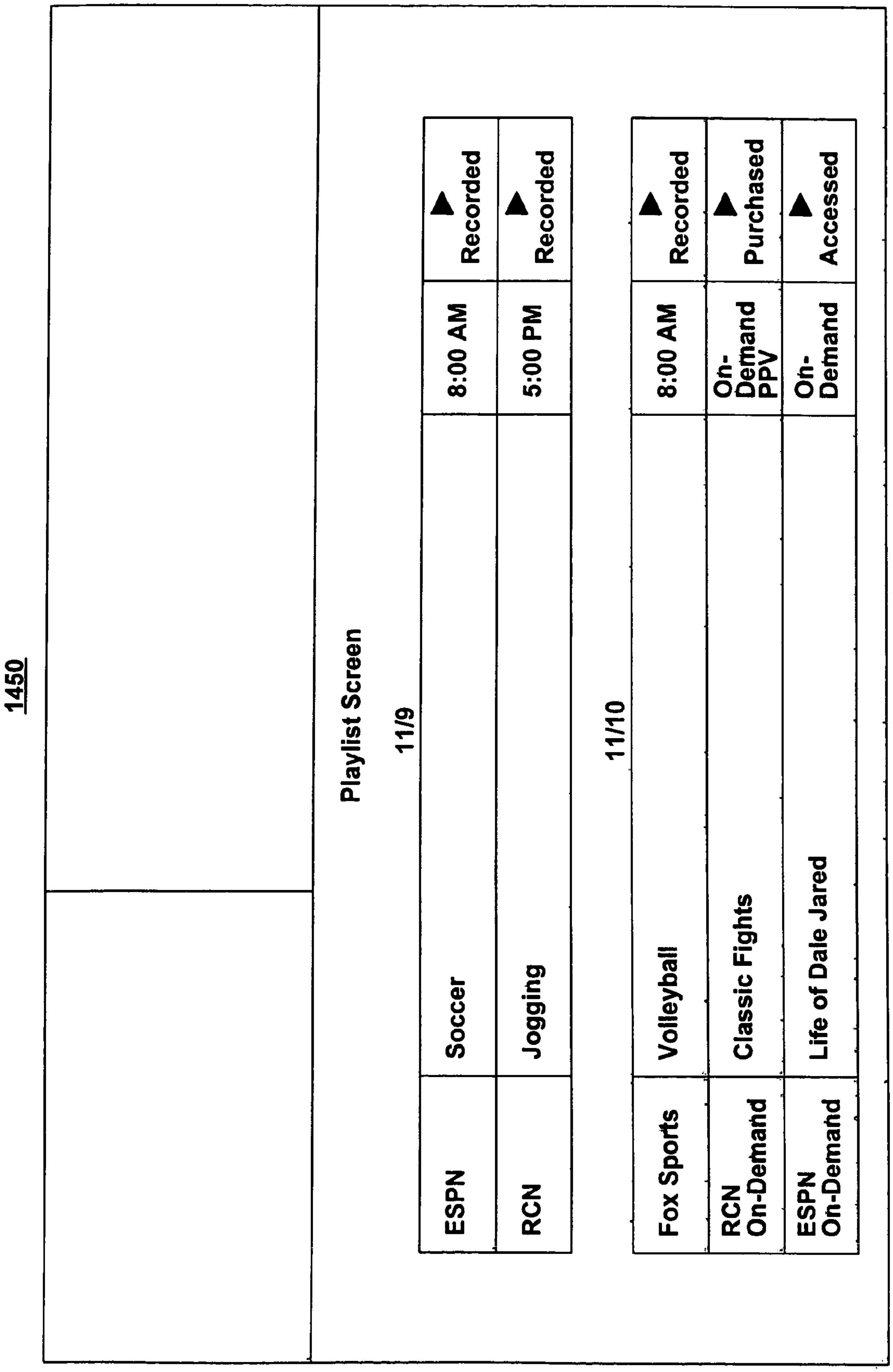
FIG. 14A shows an illustrative channel group play list screen in accordance with the present invention.

In an alternative approach, listings for programming reminders, recordings, and purchased or previously accessed programming from the channel group may be provided by the guidance application in suitable combinations. For example, as illustrated by FIG. 14, a recording screen 1400 may provide the user with a list of all the pending recordings and completed recordings for the channel group. FIG. 14A illustrates a play list screen that provides all the recorded, purchased, and previously accessed media listings that are accessible to the user. Alternatively, each list of information for the channel group may be provided on separate screens.

Figure 15:
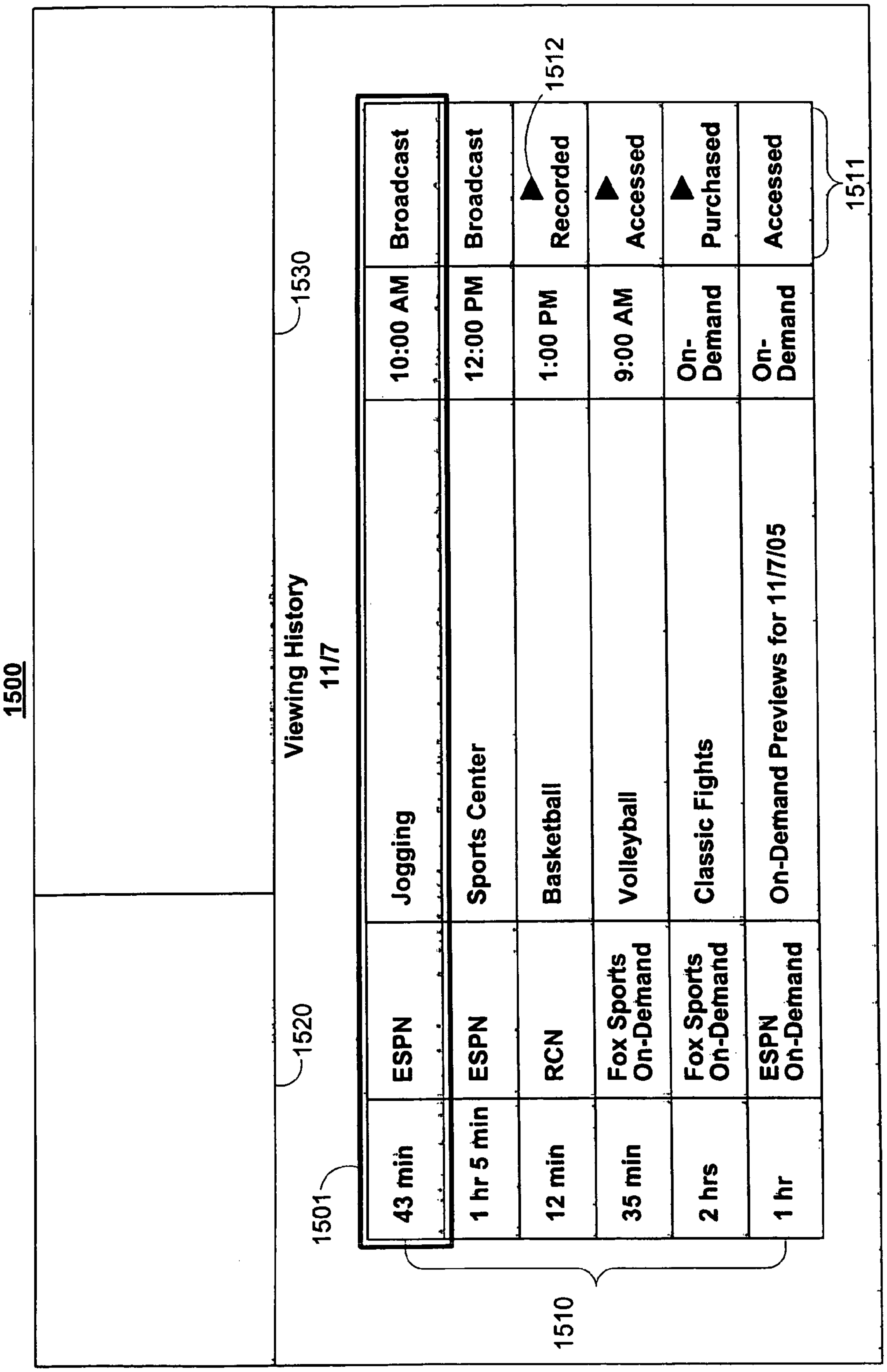
FIG. 15 shows an illustrative channel group viewing history screen in accordance with the present invention.

FIG. 15 illustrates another aspect of the present invention in which a viewing history of the channel group is provided. The viewing history screen 1500 may provide the user with a list of all the media programming accessed by the user through the channel group in a past period. In one approach illustrated by screen 1500, the viewing history screen may be organized by the date on which the programming was accessed. In another approach, the viewing history may be a single cumulative list for a set period (e.g., five days). In order to keep the number of programs appearing in the viewing history screen to a reasonable level, it may be desirable to require a certain level of user attention to a program before the program is considered to have been accessed. For example, a program may only be entered onto the viewing history screen when it was accessed by the user for longer than five minutes. This approach would eliminate a large number of entries in the viewing history screen due to channel browsing by the user.

As shown in screen 1500, the viewing history screen may provide elements 1510 that represent media programming previously accessed by the user through the channel group. The viewing history screen may be accessed by the user for a given channel group through the channel group portal screen. For example, the user may select item 1007 on screen 1000 to access view history screen 1500 for the sports channel group. Media programming may be accessed through viewing a program on one of the group channels, requesting an on-demand or pay-pay-view program made available through the channel group, or accessing other media provided through the channel group (e.g., games, web sites). Elements 1510 may indicate the group channel on which the programming was carried, the title of the program, the original broadcast time of the program (if relevant), and the duration for which the user accessed the program. In addition, element 1510 may also provide an indicator 1511 on each program. The status indicator provides information on the nature of the programming that was accessed. For example, the status indicator may show that an accessed program was a broadcast program, an on-demand program, or a pay-per-view program. The status indicator may also serve to show whether a previously accessed program is currently available for access (e.g., using marker 1512). Previously accessed media programming that may be available for current user access include programming that has been recorded, on-demand programming that remains available for user request through the on-demand content provider, and previously purchased pay-per-view programming that remains available for access to the user (e.g., a three-day movie pass purchased by the user). For programs that remain accessible by the user, user selection of the corresponding element 1510 (e.g., by placing a cursor on the element and pressing the select key on the user input device) provides access to the programming (e.g., playback of the program).

As shown in FIG. 15, the user may navigate cursor 1501 to highlight one of the elements 1510 on the viewing history screen. Reduced scale video window 1520 and description 1530 may cooperate to provide information on the previously accessed media programming highlighted by the cursor. For example, information display area 1530 may provide descriptive information on the previously accessed programming and window 1520 may provide video related to the programming. If, for example, the highlighted programming remains available for current access by the user, window 1520 may begin playback of the programming. As previously described in connection with the reduced scale video window, playback of video may require user initiation (e.g., the pressing of the INFO key on the user input device while highlighting element 1510 with the cursor). In the approach where reduced scale video of the programming has already began in window 1520 when the user chooses to access the programming, the guidance application may query the user on whether the user would like to begin playback from the start of the program or continue the playback already in progress in window 1520.

If the previously accessed programming selected by the user is not currently available for access, the guidance application may indicate to the user that the selected programming is not available for access, and when applicable for the selected program, the guidance application may provide the user with information regarding a re-broadcast (i.e., re-run) of the previously accessed programming or information on the next installment of the series to which the selected programming belongs.

In some instances, window 1520 and area 1530 may provide information on previously accessed programming with the benefit of hindsight. For example, area 1530 may display descriptive information of a past sports contest that includes a recap of the contest and statistics of the contest, while window 1520 may display highlight reel video clips of the contest. In another approach, window 1520 and area 1530 may be used to promote another installment of a programming series when the user highlights or selects a previously accessed installment of the series. In some embodiments, when an element 1510 is highlighted a user may press a select or info key to access additional detailed information about the programming or perform other functions related to the programming.

It should be understood that viewing history screen 1500 is merely illustrative and further aspects of the viewing history screen may be provided, including the sorting and searching of the previously accessed programming from the channel group.

In another aspect of the present invention, the guidance application may enable the user to create custom channel groups by creating and editing the channel group roster (i.e., the list of channels and media listings that are part of the channel group). In one embodiment illustrated by FIG. 16, the user may create a custom channel group by selecting the channels to be included in the channel roster. Screen 1600 may be accessed upon user selection of element 706 in the channel group selection screen of FIG. 7. Channel group creation screen 1600 may include a list of pre-existing channel groups and a list of all the channels provided by the service provider or received by the user equipment. The displayed channels and channel groups are represented by interactive elements 1610 and checkboxes 1605. A cursor 1601 is provided, and user selection of a highlighted checkbox 1605 corresponding to a channel or channel group element 1610 (e.g., by placing the cursor on the checkbox and pressing the select key) may result in the channel or channel group being added to the channel group roster display 1620 (and a checkmark being placed next to the selected channel or channel group element). The user may also receive information on the channels or channel groups to aid in the roster selection. For example, when the user places the cursor on a channel group element and presses the info key, the guidance application may provide the user with information on the channel group (e.g., channels making up the channel group, the nature of the channel group) by displaying an overlay 1650 (similar to overlay 850 of FIG. 8) or by leading the user to a separate information screen. Similarly, when the user requests information on a highlighted channel element 1610, the guidance application may use a similar mechanism to provide information on the channel (e.g., the nature of programming carried by the channel). In some instances, the user may wish to add individual media listings to the channel group roster instead of an entire media channel. As illustrated in FIG. 16, this may be accommodated by displaying an overlay 1660 (additional to overlay 1650) upon user selection of a channel element 1610. Overlay 1660 may include media listings 1661 that are available through the selected channel. For example, screen 1600 shows that an interactive gaming channel has been selected by the user and that overlay 1660 contains a list of all the interactive gaming applications 1631 offered through the gaming channel. Similar to the operation of elements 1610 and checkboxes 1605, applications 1661 may be individually selected by selecting checkboxes 1662, and the user may receive information on the individual applications by selecting elements 1661. An overlay similar to overlay 1660 may also be used to aid in user selection of channels included in a selected channel group element, such that the user may use the channel group elements 1610 as a guide to desired individual channels. When the user is finished setting the channel group roster 1620, the user may highlight and select item 1630, which creates the channel group (e.g., for access through channel group selection screen 700) and exits the application to the previous screen (e.g., screen 700). Screen 1600 may also be provided to the user to edit a channel group roster. For example, the user may select to edit a channel group by selecting element 1008 in the channel group portal screen of FIG. 10. The guidance application may enable the user to edit a channel group roster whether the roster was originally populated by the service provider or by the user.

Figure 17:
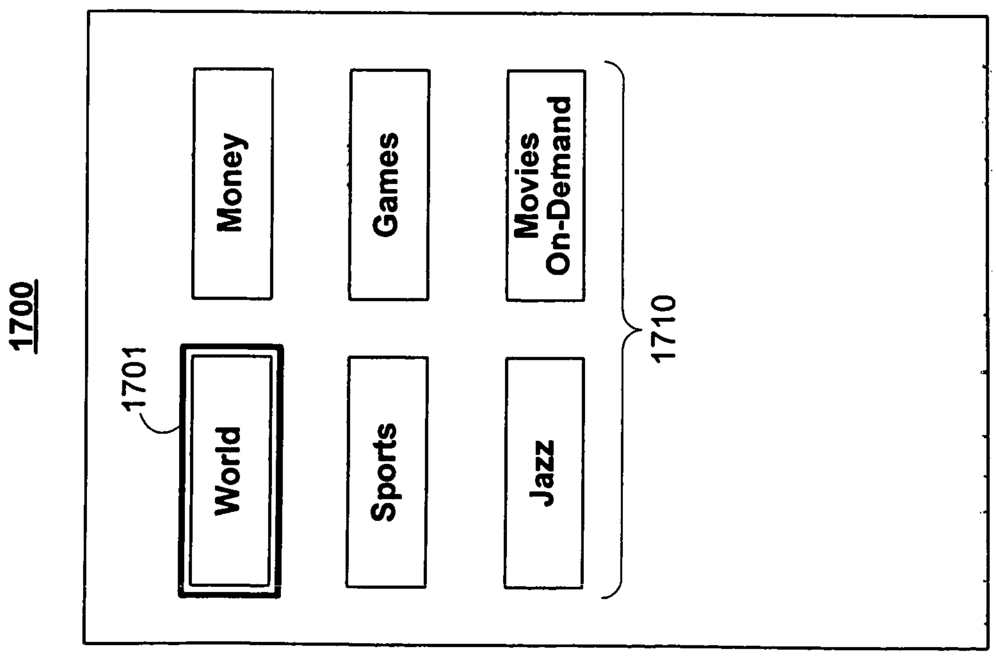
FIG. 17 shows an illustrative channel group selection screen in accordance with the present invention.

It should be understood that the media programming referred to with respect to the present invention may be any suitable media programming, such as television programming, audio programming, Internet web pages, interactive applications (e.g., games, home shopping applications), photographs, etc. It should also be understood that media channels as referred to with respect to the present invention may be any provider or source of media programming, such as a television channel, an Internet web site, a satellite radio channel, etc. A single channel group may contain a combination of different media types in its roster. In another embodiment of the present invention, the interactive media guidance application may be implemented on a non-traditional platform such as a PDA and may provide guidance for mixed media channels such as Internet web sites, satellite radio channels, interactive gaming channels, and on-demand movie channels. As illustrated in FIG. 17, interactive channel group elements 1710 may be provided for groups of Internet web sites, satellite radio stations, interactive gaming channels, and on-demand movie channels. For example, interactive element 1710 "World" may represent a group of Internet web sites and other types of programming that concentrate on world events. Interactive elements 1710 "Sports" and "Money" may similarly represent groups of Internet web sites and other types of programming that concentrate on the stated topics. Interactive element 1710 "Jazz" may represent a group of satellite radio stations that specialize in jazz music. As previously described in other embodiments, the choice of media channel groups to be displayed in screen 1700 may be set by the service provider, by the user, or some combination thereof.

Figure 18:
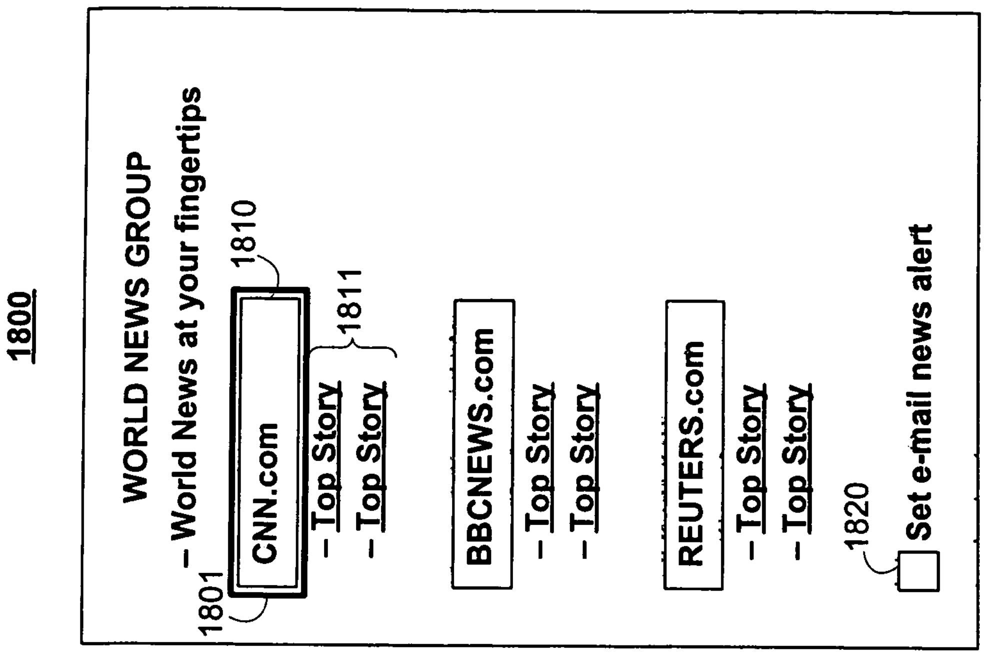
FIG. 18 shows an illustrative channel group portal screen in accordance with the present invention.

Upon user selection of an interactive channel group element 1710 (e.g., by navigating cursor 1701 onto the element and indicating the selection using the user inputs provided by the PDA), the guidance application may provide a group portal screen that displays information on the media channel group and enables access to functions that are applicable to the group. For example, user selection of element 1710 "World" may cause the guidance application to display portal screen 1800, which includes a list of the media channels included in the group (e.g., CNN.com, BBCNews.com, Reuters.com). Further, media listings 1811 may be provided for each media channel, for example, to feature links to web pages containing top news stories. User selection of interactive element 1810 (e.g., by navigating cursor 1801 onto the element and indicating the selection using the user inputs provided by the PDA) may provide access to the home page of the user selected web site. Similar user selection of interactive elements 1811 may provide direct access to the deep-linked web page requested by the user (e.g., the web page providing the promoted news story). The user may also be able to receive information on the individual group web sites (e.g., nature of the web site content) by, for example, pressing an information request key on the PDA device while highlighting website element 1810. The guidance application may also display to the user a list of functions executable on the channel group and enable the user to initiate a function on the group. As illustrated in FIG. 18, element 1820 may represent a function that sets an electronic mail alert for the media channels (e.g., web sites) of the group. When executed, this function may, for example, alert the user via electronic mail whenever a new top story is added to any of the web sites of this channel group.

Figure 19:
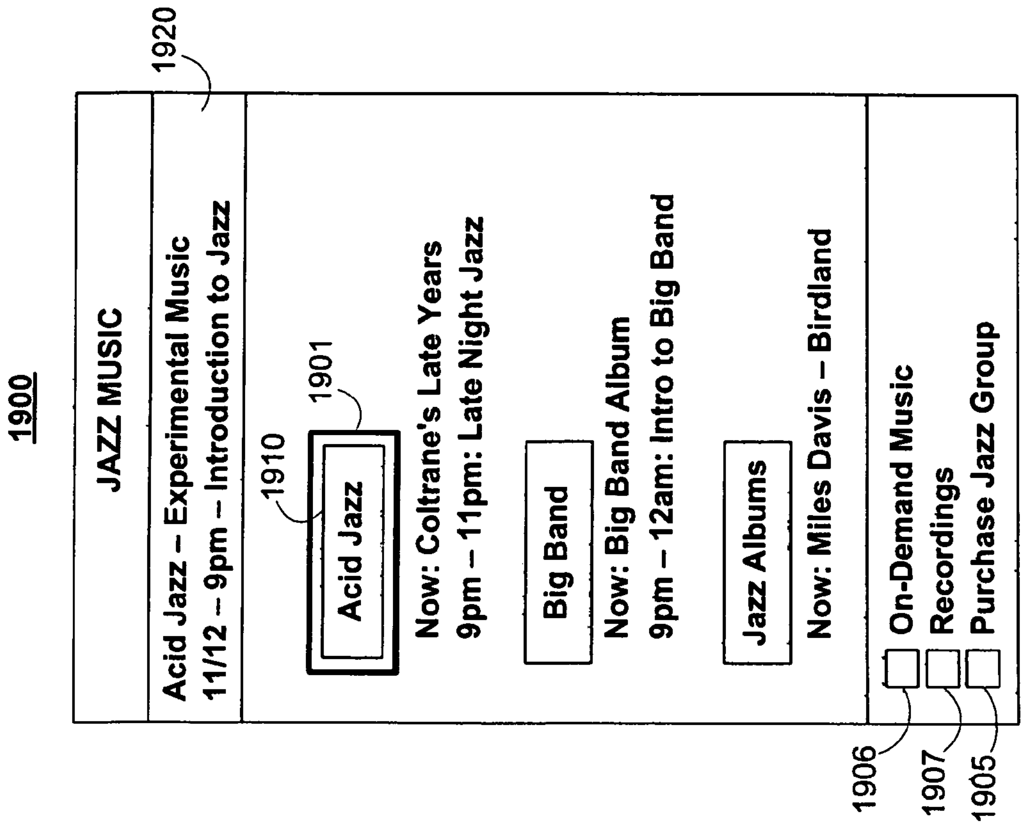
FIG. 19 shows an illustrative channel group portal screen in accordance with the present invention.

In another example, FIG. 19 illustrates a jazz music channel group portal screen that may be displayed upon user selection of element 1710 "Jazz." A plurality of satellite radio stations that concentrate on jazz programming may be displayed on screen 1900 as elements 1910, along with other media that may be part of the channel group roster such as music on demand and jazz-related websites. An information display area 1920 may be used to provide information on the channel group. For example, area 1920 may include a brief promotional message about the channel group as a whole, a promotional message about an individual radio station, and information on featured programming provided through the channel group. As previously described, promotional information on featured programming may be periodically changed to promote multiple programs. Area 1920 may also be used to provide information on a user highlighted radio station, such as a description of the station's musical genre. Screen 1900 may provide media listings for the group channels. For example, a listing of the current programming on the music channel may be provided under each channel element 1910. Listings for past and future programming may also be provided. User selection of music channel elements 1910 (e.g., by navigating cursor 1901 onto the element and indicating the selection using the user inputs provided by the PDA) may provide access (i.e., tune) to the selected radio station or, in the event the station has not been subscribed to by the user, a preview clip of the station programming. User selection of element 1910 may also cause the guidance application to display a screen that provides information (e.g., media listings) only on the selected radio station and allows the user to perform channel-specific functions related to the selected channel.

Screen 1900 may enable the user to receive previews of the displayed media listings. For example, by selecting a media listing that is a currently broadcast radio program, the user may be tuned to the program. When the selected media listing is a future broadcast, the user may receive a preview clip of the program. As previously described in other embodiments, the guidance application may also use screen 1900 to provide access to an on-demand listings screen (1906), a multipurpose screen (and any screens containing the constituent listings provided by the multipurpose screen, such as a recordings screen (1907)), an access history screen, a channel group roster edit screen, etc. Screen 1900 may also provide the user with access to functions that are executable on the channel group. For example, user selection of interactive element 1905 may cause the guidance application to process a subscription for all the radio stations (and, optionally, the individual media listings (e.g., on-demand albums)) provided through the jazz group and subsequently enable access to the same.

It should be understood that the screens of FIGS. 7-16, as well as the screens of FIGS. 17-19 are merely examples of combinations of features. Alternate embodiments may combine the features shown on these screens in different ways, add features, or otherwise vary from these examples.

Figure 20:
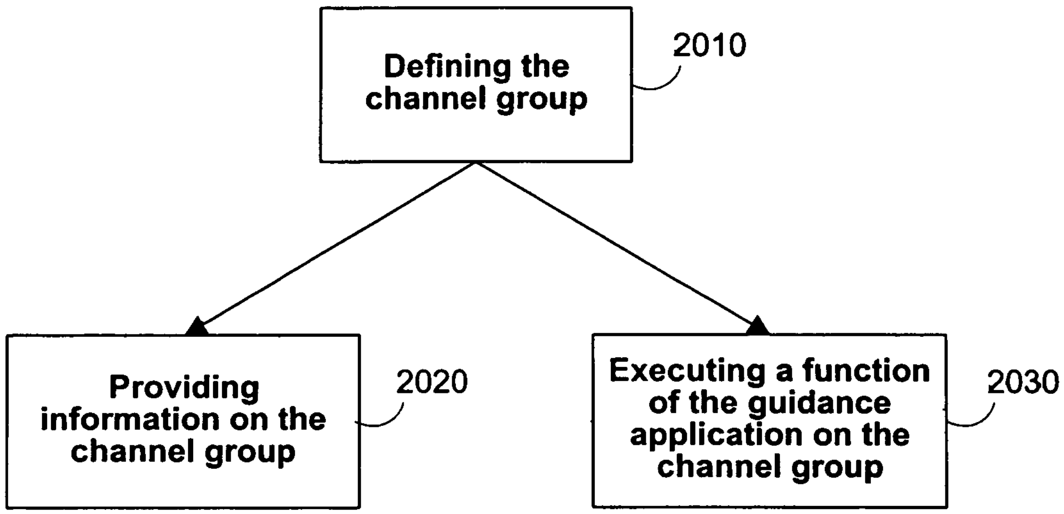
FIG. 20 shows an illustrative flow diagram for providing channel groups in an interactive media guidance application in accordance with the present invention.

FIG. 20 shows an illustrative flow diagram for providing channel groups in an interactive media guidance application in accordance with the present invention.

Figure 21:
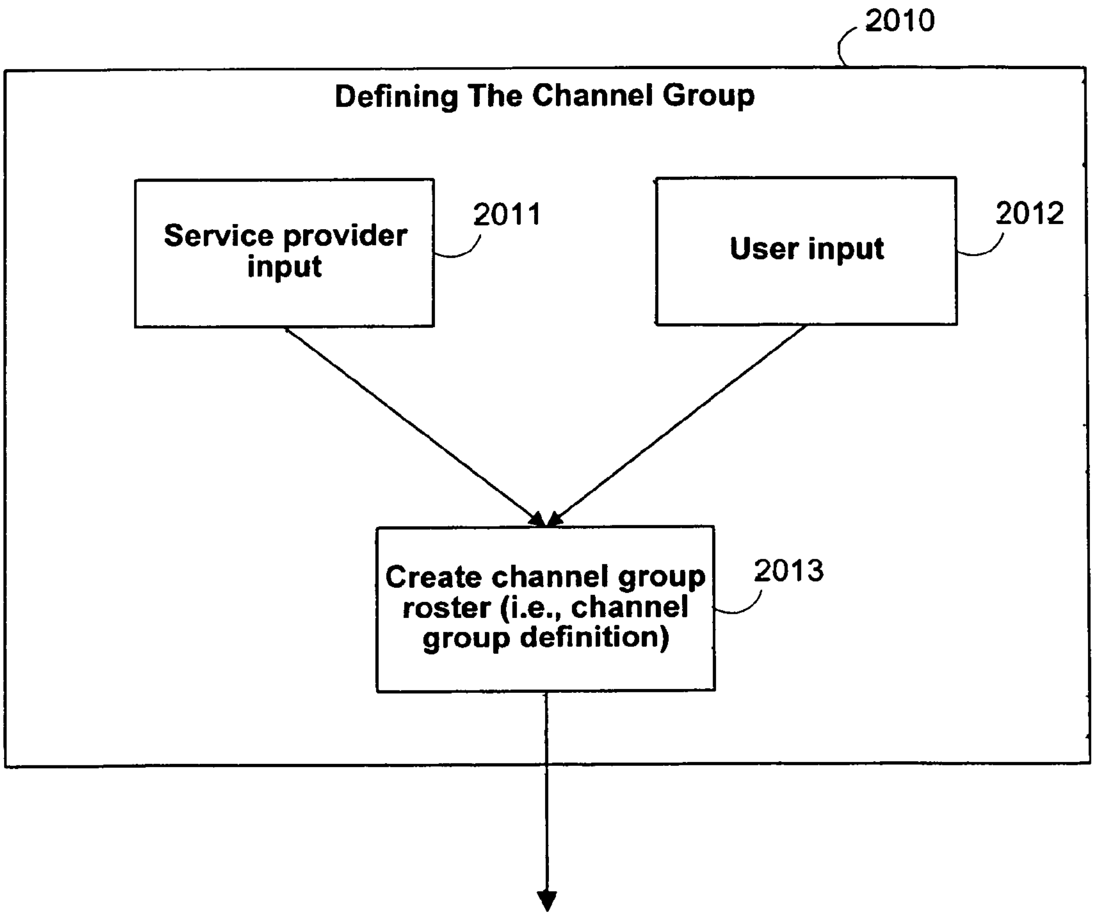
FIG. 21 shows an illustrative flow diagram for defining the channel group in accordance with the present invention.

At step 2010, the channel group is defined. The channel group definition may be a channel group roster, which may include a list of media channels to be included in the channel group, and may also include individual media listings that may not originate from one of the group channels. The channel group roster (i.e., group channels and any individual media listings in the roster) may share at least one common characteristic. As detailed in the illustrative flow chart of FIG. 21, step 2010 may include service provider input step 2011 and user input step 2012. At step 2011, the channel group definition may be provided, for example, by service provider 142 (FIG. 1). For example, the service provider may use profile information on a user as an input to the channel group roster. The service provider may use one or more common characteristic of a media channel or of a media listing to organize the channel group roster. In addition, the service provider may exercise human editorial control over the channel group roster. At step 2012, the channel group roster may include input from the user. In one approach, the channel group roster may be entirely provided by a user, for example, utilizing the editing screen of FIG. 16. In another approach, the user may edit a channel group roster previously provided by the service provider. At step 2013, the channel group roster (i.e., the channel group definition) is created and may be stored, for example, at media distribution facility 104 or user equipment 108 (FIG. 1) with other guidance application data. For example, server 140 of media distribution facility 104 may provide a channel group database that stores the channel group rosters. The database may include database items representing each of the channel groups that have been defined in the system (e.g., by the service provider or the user). The channel group database item may include a channel group roster database item, which in turn includes database items that represent each individual media channel and media listing in the channel group roster.

Figure 22:
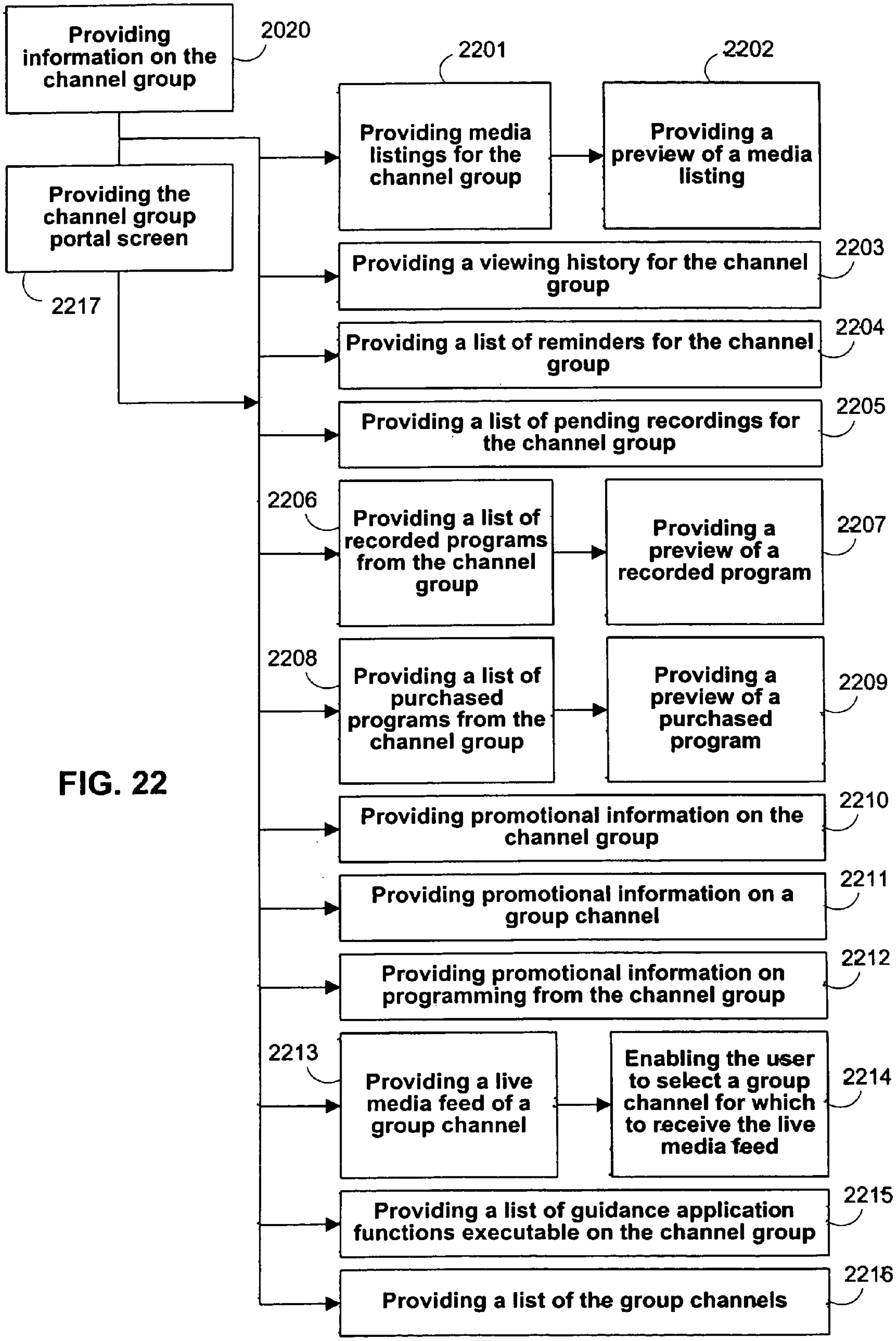
FIG. 22 shows an illustrative flow diagram for providing information on the channel group in accordance with the present invention.

At step 2020, information on the channel group is provided to the user. As detailed in the illustrative flow chart of FIG. 22, a myriad of information on the channel group may be provided at steps 2201-2216 included in step 2020. At step 2201, media listings for the channel group may be provided to the user, for example, at channel group portal screen 1000. Media listings for the channel group may include media listings for the group channels and any individual media listings included in the channel group roster. Media listings for the channel group may include on-demand media listings (which may or may not be pay-per-view) (FIG. 12). In the illustrative system of FIG. 1, for example, media listings may be stored in a media listings database on server 140. Each media listing may be individually identified (e.g., using a listing code) and may be cross-referenced with the media channel through which the listing is provided. Upon user request to view media listings for the channel group, the guidance application may use the channel group roster database item stored on server 140 to query the media listings database for media listings that correspond with the media channels and media listings identified in the channel group roster database item. The corresponding media listings for the channel group may then be transmitted to the user equipment for display to the user.

A preview of a media listing may be provided at step 2202, for example, in the form of a video preview of an on-demand media listing. In the illustrative system of FIG. 1, for example, media programming may be stored in a media programming database on server 140 and may be keyed to a corresponding media listing. When the user requests a preview of a media listing, the guidance application may query the media programming database using the key that corresponds with the media listing. The media programming for the corresponding media listing may then be transmitted to user equipment to provide the preview.

A viewing history of the channel group may be provided at step 2203. The viewing history tracks the media accessed by the user through the channel group in a given period of time (FIG. 15). For example, in the illustrative system of FIG. 1, each channel group database item may include a viewing history database item. The viewing history database item includes items representing each media listing accessed by the user through the channel group. For example, when the user accesses a given media listing with the user equipment, the guidance application may transmit the given media listing to server 140. Server 140 may use the media channel information for the listing to query the channel group database for the channel groups to which the media channel belongs. The media listing is then added to the viewing history database item for the appropriate channel groups.

A list of programming reminders for the channel group may be provided at step 2204. A list of pending recordings and recorded programs for the channel group may be provided at steps 2205 and 2206. A list of purchased programs from the channel group may be provided at step 2208. For example, in the illustrative system of FIG. 1, reminders, pending recordings, and recorded programs may all be represented as media listing database items in one or more reminder/recording databases on server 140. Each media listing item stored in the databases may include the listing code and an identification (e.g., channel code) of the media channel on which the media listing is provided. Therefore, upon user request to view reminders or recordings for a channel group, the guidance application may query the appropriate reminder/recording databases using the media channel codes and media listings codes included in the channel group roster database item. A preview of a recorded program or purchased program from the channel group may be provided at steps 2307 and 2309, respectively. Such previews may be accomplished in a manner similar to the previews provided at step 2202. Steps 2204-2209 may be provided, for example, through multipurpose screen 1300 (FIG. 13).

Promotional information on the channel group itself may be provided at step 2210. Promotional information on the channel group may include a video clip promoting the channel group. Promotional information on a group channel, such as a video clip promoting a group channel, may be provided at step 2211. Promotional information on media programming from the channel group, such as information or videos on featured programming, may be provided at step 2212. For example, in the illustrative system of FIG. 1, server 140 may include a promotional information database. Each parcel of promotional information (whether the information is audio, video, text, graphics, etc.) is stored in the database with a database item that identifies the promotional information. The identifier may include, as appropriate, one or more codes that associate the promotional information with a channel group, a media channel, or a media listing. When the guidance application requires the promotional information (e.g., for display on screen 1000), the guidance application may query the promotional information database using the channel group, media channel, and media listings codes that are included in the channel group database item to retrieve promotional information related to the channel group for display.

A live media feed (e.g., video feed, audio feed) of a group channel may be provided at step 2213 and may be selectively tuned by the user at step 2214. For example, in the illustrative system of FIG. 1, each media channel or media listing database item included in the channel group roster database item may include a programming source identifier that directs the guidance application to the programming source for the media channel or media listing (e.g., digital television channel, Internet web site URL). The guidance application may direct the user equipment to the programming source specified by the programming source identifier to receive a live media feed.

A list of guidance application functions that are executable on the channel group (e.g., Set as Favorite, Lock, Subscribe) may be provided at step 2215. For example, in the illustrative system of FIG. 1, each media channel and media listing database item included in the channel group roster database item may include a list of guidance application functions that are executable on the media channel or media listing. The list of functions that are executable on the channel group may be created by extracting the common denominator functions from these individual lists.

A list of the group channels in the channel group may be provided at step 2216. In the illustrative system of FIG. 1, this list may be provided from the channel group database located on server 140.

Steps 2210-2216 may be provided, for example, through the channel group portal screen 1000 (FIG. 10). It should be understood that the above steps are illustrative only and are not exhaustive of the information on the channel group that may be provided. At step 2217, a channel group portal screen (FIG. 10) may be provided that either displays or provides access to the information of steps 2201-2216. In this manner, information on the channel group may be provided at a central location in the guidance application.

Figure 23:
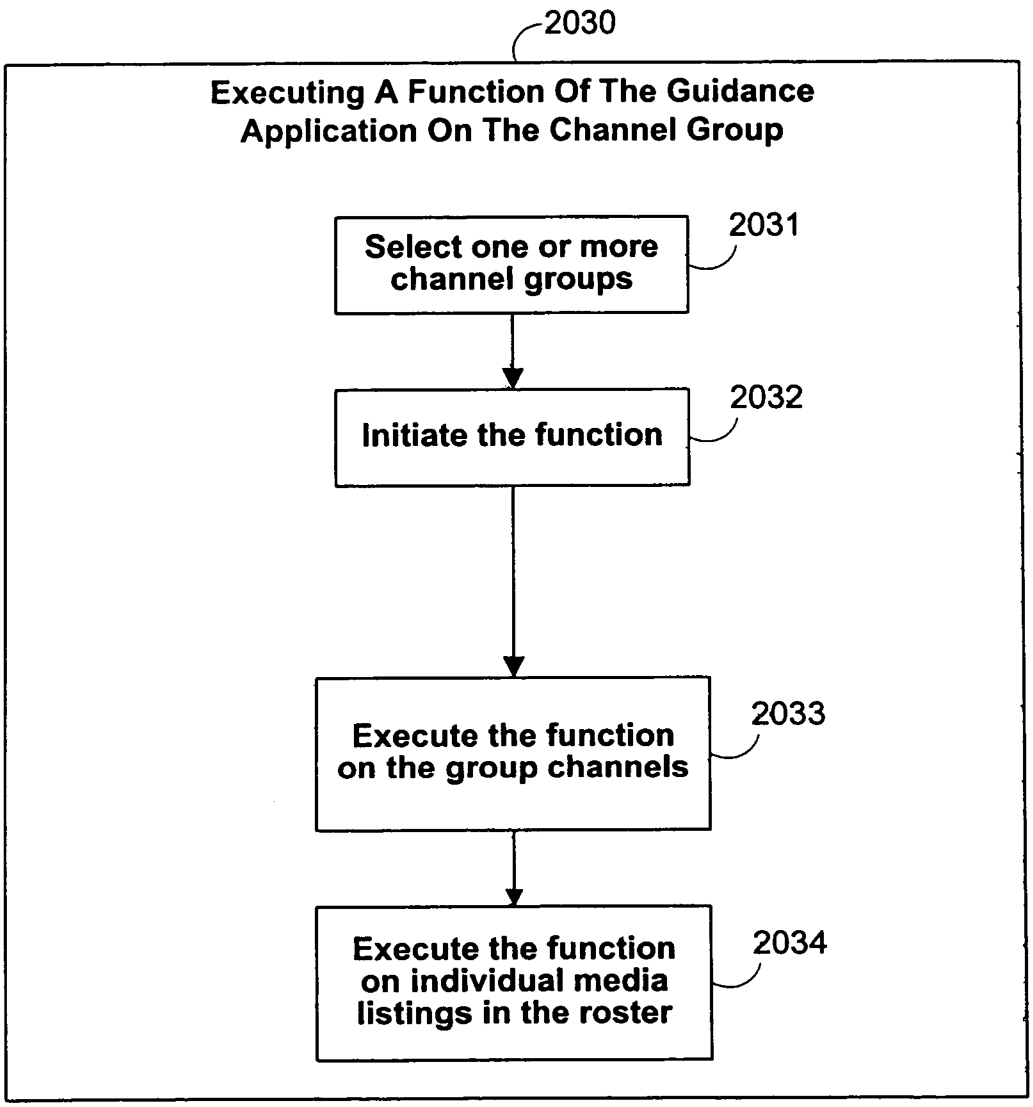
FIG. 23 shows an illustrative flow diagram for executing a function of the interactive media guidance application on the channel group in accordance with the present invention.

At step 2030, a function of the guidance application is executed on the channel group. As described in the foregoing, the guidance application may execute, for example, a "Set as Favorite," "Lock/Unlock," "Subscribe," and "News Alert" functions on one or more selected channel groups. As detailed in the illustrative flow chart of FIG. 23, step 2030 may include channel group selection step 2031, user initiation step 2032, group channel execution step 2033, and media listing execution step 2034. At step 2031, the user may select one or more channel groups on which to initiate a function of the guidance application. For example, as described in connection with screen 700 (FIG. 7), the user may select multiple channel groups for execution of a function. Alternatively, as described in connection with screen 1000 (FIG. 10), the guidance application may, by context, set the selected channel group to the currently viewed channel group. At step 2032, the user initiates a function of the guidance application on the channel group by entering a user command (e.g., via user input device 400). At step 2033, the guidance application executes the function on the group channels included in the one or more selected channel groups. For example, in executing a "Lock" function, the guidance application may lock the group channels and condition access for the locked channels upon entry of a password. At step 2404, the guidance application may optionally execute the function on any individual media listings that are included in the channel group rosters of the one or more selected channel groups, but that are not sourced from the group channels. For example, in executing the "Lock" function, the guidance application may lock access to an individual program included in the channel group roster that is not broadcast on a group channel.

For example, in the illustrative system of FIG. 1, the guidance application may construct a list of the media channels and media listings on which a function is to be performed by querying the channel group database on server 140. Using the channel group codes for the one or more channel groups selected by the user, the guidance application may access the channel group roster database items for the selected channel groups to construct the list of channels and media listings on which the function is to be executed. In some instances, the execution of the guidance application function may be achieved by changing one or more items of information in a media channel or media listing database item. For example, in one illustrative embodiment, the guidance application may execute a "Lock" function by changing the value of a parental control field in a media channel or listing database item from "N" to "Y." The guidance application may refer to a database of such media channel and media listing database items each time the guidance application receives a command to access a media channel or media listing. For example, upon receiving a user command to access a media listing, the guidance application may query this database for both the media listing database item and the media channel database item corresponding to the user selected listing. If either of the database items contain a parental control field that reads "Y," the guidance application will block access to the media listing and will execute a function that displays a request for the parental control PIN. Therefore, in this illustrative example, the guidance application may execute a function on one or more channel groups by changing certain field values in the database items corresponding to the previously constructed list (of media channels and listings on which the function is to be executed).

It should be noted that the foregoing discussion of the system of FIG. 1 in connection with the flow charts is for illustrative purposes only and should not be construed to exclude alternative systems and approaches for accomplishing the functionalities set forth in the flow charts.

It should be understood that the foregoing description is merely illustrative of the principles of the present invention and various modifications can be made by those skilled in the art without departing from the scope and spirit of the present invention.

What is claimed is:

1. A method for providing channel groups in an interactive media guidance application, the method comprising:

receiving, by a processor, a user selection of a plurality of media channels, wherein the plurality of media channels is a subset of the media channels received by user equipment;

defining a channel group that includes the user-selected media channels;

associating an interactive channel group element with the defined channel group;

generating for display a media listings grid comprising:

a plurality of media listings for a plurality of channels, organized by channel; and the interactive channel group element for the channel group displayed as a channel;

receiving, by the processor, a user selection of the interactive channel group element;

responsive to receiving the user selection of the interactive channel group element, generating for display a list of functions of the guidance application available for execution on the channel group and generating for display a channel group screen providing information on the channel group, wherein the information includes media listings for the plurality of media channels of the channel group, and wherein an associated channel is identified for each of the media listings;

receiving, while the channel group screen is displayed, a user command to initiate a function of the list of functions of the guidance application on the channel group; and executing the function on the channel group in response to the user command.

2. The method of claim 1, wherein executing the function comprises executing the function on each of the plurality of media channels.

3. The method of claim 1, wherein receiving a user command to initiate a function comprises receiving a user command to set the channel group as a favorite channel group, and wherein executing the function comprises setting the plurality of media channels as favorite media channels.

4. The method of claim 1, wherein receiving a user command to initiate a function comprises receiving a user command to block access to the channel group, and wherein executing the function comprises blocking access to the plurality of media channels using a password.

5. The method of claim 1, wherein receiving a user command to initiate a function comprises receiving a user command to subscribe to the channel group, and executing the function comprises subscribing a user to at least some of the plurality of media channels.

6. The method of claim 1, wherein receiving a user command to initiate a function comprises receiving a user command to set an alert for the channel group, and wherein executing the function comprises alerting a user when a condition is met for any of the plurality of media channels.

7. The method of claim 1, wherein defining a channel group comprises receiving a list of the plurality of media channels.

8. The method of claim 7, further comprising receiving user modifications to the list.

9. The method of claim 7, wherein receiving a list of the plurality of media channels comprises receiving a list of media channels that share at least one common characteristic.

10. The method of claim 1, further comprising providing access to a media program in response to a user selection of a corresponding media listing from the channel group screen.

11. The method of claim 1, wherein providing information on the channel group further comprises at least one of: providing a list of the plurality of media channels, providing media listings for the channel group, providing a list of on-demand media programs for the channel group, providing a list of reminders for the channel group, providing a list of pending recordings for the channel group, providing a list of recorded programs for the channel group, providing a listing of purchased programs for the channel group, and providing a viewing history of previously accessed programs for the channel group.

12. The method of claim 11, wherein providing a viewing history for the channel group comprises tracking a list of media programs accessed by a user through the channel group in a given time period.

13. The method of claim 1, wherein providing information on the channel group further comprises providing a preview for at least one of: an on-demand media program from the channel group, a recorded media program from the channel group, a purchased media program from the channel group, and a previously accessed media program for the channel group.

14. The method of claim 13, wherein providing a preview comprises generating for display a reduced scale video of a program.

15. The method of claim 1, wherein providing access to the information on the channel group comprises generating for display on the screen at least one of: a video clip promoting the channel group, a video clip promoting one of the plurality of media channels, a list of the plurality of media channels, promotional information on media programming accessible through the channel group, a live feed from one of the plurality of media channels, media listings for the channel group, and a list of the functions that are executable on the channel group.

16. The method of claim 1, wherein providing access to the information on the channel group comprises providing access on the screen to at least one of: a viewing history of the channel group, a list of reminders for the channel group, a list of pending recordings for the channel group, a list of completed recordings for the channel group, a list of purchased programs for the channel group, and on-demand media listings for the channel group.

17. The method of claim 1, wherein executing the function on the channel group comprises:

determining, for each media channel in the channel group, whether the function has already been executed on that media channel;

based on the determination, identifying a subset of media channels in the channel group on which the function has not been executed; and executing the function on only the identified subset of media channels.

18. A method for providing channel groups in an interactive television program guide application, the method comprising:

receiving, by a processor, a user selection of a plurality of television channels, wherein the plurality of television channels is a subset of the television channels received by user equipment;

defining a channel group that includes the user-selected television channels;

associating an interactive channel group element with the defined channel group;

generating for display a program listings grid comprising:

a plurality of program listings for a plurality of television channels, organized by channel; and the interactive channel group element for the channel group displayed as a channel;

receiving, by the processor, a user selection of the interactive channel group element;

responsive to receiving the user selection of the interactive channel group element, generating for display a list of functions of the guidance application available for execution on the channel group and generating for display a channel group screen providing information on the channel group, wherein the information includes program listings for the plurality of television channels of the channel group, and wherein an associated channel is identified for each of the media listings;

receiving, while the channel group screen is displayed, a user command to initiate a function of the list of functions of the program guide application on the channel group; and executing the function on the plurality of television channels in response to the user command.

19. The method of claim 18, further comprising providing a list of favorite television channels.

20. The method of claim 18, wherein receiving a user command to initiate a function comprises receiving a user command to block access to the channel group, and wherein executing the function comprises blocking access to the plurality of television channels using a password.

21. The method of claim 18, wherein receiving a user command to initiate a function comprises receiving a user command to subscribe to the channel group, and executing the function comprises subscribing a user to at least some of the plurality of television channels.

22. The method of claim 18, wherein providing information on the channel group further comprises providing a list of on-demand programs available through the channel group.

23. The method of claim 18, wherein providing information on the channel group further comprises providing a reduced scale video preview of a television program corresponding to a displayed program listing from the channel group screen.

24. The method of claim 18, wherein providing information on the channel group further comprises providing a reduced scale video of a live television broadcast from one of the plurality of television channels.

25. An interactive media guidance system for providing channel groups comprising:

an interactive media guidance application implemented at least partially on circuitry configured to:

receive a user selection of a plurality of media channels, wherein the plurality of media channels is a subset of the media channels received by user equipment;

define a channel group that includes the user-selected media channels;

associate an interactive channel group element with the defined channel group;

generate for display a media listings grid comprising:

a plurality of media listings for a plurality of channels, organized by channel; and the interactive channel group element for the channel group displayed as a channel;

receive a user selection of the interactive channel group element;

responsive to receiving the user selection of the interactive channel group element, generate for display a list of functions of the guidance application available for execution on the channel group and generate for display a channel group screen providing information on the channel group, wherein the information includes media listings for the plurality of media channels of the channel group, and wherein an associated channel is identified for each of the media listings;

receive, while the channel group screen is displayed, a user command to initiate a function of the list of functions of the guidance application on the channel group; and execute the function on the channel group in response to the user command.

26. The system of claim 25, wherein the circuitry configured to execute the function is further configured to execute the function on each of the plurality of media channels.

27. The system of claim 25, wherein the circuitry configured to:

receive a user command to initiate a function is further configured to receive a user command to set the channel group as a favorite channel group; and execute the function is further configured to set the plurality of media channels as favorite media channels.

28. The system of claim 25, wherein the circuitry configured to:

receive a user command to initiate a function is further configured to receive a user command to block access to the channel group; and execute the function is further configured to block access to the plurality of media channels using a password.

29. The system of claim 25, wherein the circuitry configured to:

receive a user command to initiate a function is further configured to receive a user command to subscribe to the channel group;

execute the function is further configured to subscribe a user to at least some of the plurality of media channels.

30. The system of claim 25, wherein the circuitry configured to:

receive a user command to initiate a function is further configured to receive a user command to set an alert for the channel group; and execute the function is further configured to alert a user when a condition is met for any of the plurality of media channels.

31. The system of claim 25, wherein the circuitry configured to define a channel group is further configured to receive a list of the plurality of media channels.

32. The system of claim 31, wherein the circuitry is further configured to receive user modifications to the list.

33. The system of claim 31, wherein the circuitry configured to receive a list of the plurality of media channels is further configured to receive a list of media channels that share at least one common characteristic.

34. The system of claim 25, wherein the circuitry is further configured to provide access to a media program in response to a user selection of a corresponding media listing.

35. The system of claim 25, wherein the circuitry configured to provide information on the channel group is further configured to provide at least one of: a list of the plurality of media channels, media listings for the channel group, a list of on-demand media programs for the channel group, a list of reminders for the channel group, a list of pending recordings for the channel group, a list of recorded programs for the channel group, a listing of purchased programs for the channel group, and a viewing history of previously accessed programs for the channel group.

36. The system of claim 35, wherein the circuitry configured to provide a viewing history for the channel group is further configured to track a list of media programs accessed by a user through the channel group in a given time period.

37. The system of claim 25, wherein the circuitry configured to provide information on the channel group is further configured to provide a preview for at least one of: an on-demand media program from the channel group, a recorded media program from the channel group, a purchased media program from the channel group, and a previously accessed media program for the channel group.

38. The system of claim 37, wherein the circuitry configured to provide a preview is further configured to generate for display a reduced scale video of a program.

39. The system of claim 25, wherein the circuitry configured to provide access to the information on the channel group is further configured to generate for display on the screen at least one of: a video clip promoting the channel group, a video clip promoting one of the plurality of media channels, a list of the plurality of media channels, promotional information on media programming accessible through the channel group, a live feed from one of the plurality of media channels, media listings for the channel group, and a list of the functions that are executable on the channel group.

40. The system of claim 25, wherein the circuitry configured to provide access to the information on the channel group is further configured to provide access on the screen to at least one of: a viewing history of the channel group, a list of reminders for the channel group, a list of pending recordings for the channel group, a list of completed recordings for the channel group, a list of purchased programs for the channel group, and on-demand media listings for the channel group.

41. An interactive television program guide application for providing channel groups comprising:

an interactive media guidance application implemented at least partially on circuitry configured to:

receive a user selection of a plurality of television channels, wherein the plurality of television channels is a subset of the television channels received by user equipment;

define a channel group that includes the user-selected television channels;

associate an interactive channel group element with the defined channel group;

generate for display a program listings grid comprising:

a plurality of program listings for a plurality of television channels, organized by channel; and the interactive channel group element for the channel group displayed as a channel;

receive a user selection of the interactive channel group element;

responsive to receiving the user selection of the interactive channel group element, generate for display a list of functions of the guidance application available for execution on the channel group and generate for display a channel group screen provide information on the channel group, wherein the information includes program listings for the plurality of television channels of the channel group, and wherein an associated channel is identified for each of the media listings;

receive, while the channel group screen is displayed, a user command to initiate a function of the list of functions of the program guide application on the channel group; and execute the function on the plurality of television channels in response to the user command.

42. The system of claim 41, wherein the circuitry is further configured to provide a list of favorite television channels.

43. The system of claim 41, wherein the circuitry configured to:

receive a user command to initiate a function is further configured to receive a user command to set the channel group as a favorite channel group; and execute the function is further configured to add the plurality of television channels to the list of favorite television channels.

44. The system of claim 41, wherein the circuitry configured to:

receive a user command to initiate a function is further configured to receive a user command to block access to the channel group; and execute the function is further configured to block access to the plurality of television channels using a password.

45. The system of claim 41, wherein the circuitry configured to:

receive a user command to initiate a function is further configured to receive a user command to subscribe to the channel group; and execute the function is further configured to subscribe a user to at least some of the plurality of television channels.

46. The system of claim 41, wherein the circuitry configured to provide information on the channel group is further configured to provide a list of on-demand programs available through the channel group.

47. The system of claim 41, wherein the circuitry configured to provide information on the channel group is further configured to provide a reduced scale video preview of a television program corresponding to a displayed program listing.

48. The system of claim 41, wherein the circuitry configured to provide information on the channel group is further configured to provide a reduced scale video of a live television broadcast from one of the plurality of television channels.

* * * * *